US006148258A

United States Patent [19]

Boisvert et al.

[11] Patent Number: 6,148,258

[45] **Date of Patent: *Nov. 14, 2000**

[54] ELECTRICAL STARTING SYSTEM FOR DIESEL ENGINES

[75] Inventors: Mario Boisvert, Reed City; David W. Shank, Big Rapids; Timothy J. Rigling, Tustin; Ronald L. Ballast, McBain, all of Mich.

[73] Assignee: Nartron Corporation, Reed City, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/076,291

[22] Filed: May 12, 1998

Related U.S. Application Data

[63] Continuation-in-part of application No. 08/931,470, Sep. 16, 1997, Pat. No. 6,009,369, which is a continuation-in-part of application No. 08/508,063, Jul. 27, 1995, Pat. No. 5,729, 456, which is a continuation of application No. 08/042,239, Apr. 1, 1993, Pat. No. 5,570,666, which is a continuation of application No. 07/785,462, Oct. 31, 1991, abandoned.

[51] Int. Cl.$^{7}$ .............................. G06F 19/00; G06G 7/70

[52] U.S. Cl. ......................... 701/99; 701/102; 123/145 A; 123/179.21; 123/179.6; 219/486; 219/492; 219/497

[58] Field of Search .............................. 701/99, 101, 102, 701/113; 123/145 A, 179 H, 179 GH, 179.6, 179.21, 179.25, DIG. 3, 179.3; 219/492, 497, 511, 518; 361/265, 757; 74/7 E, 7 C, 6

[56] References Cited

U.S. PATENT DOCUMENTS

| | | | |
|---|---|---|---|
| 4,075,998 | 2/1978 | Krauss et al. | 123/179 H |
| 4,088,109 | 5/1978 | Woodruff et al. | 123/179 H |
| 4,106,465 | 8/1978 | Bernhardt et al. | 123/179 H |
| 4,137,885 | 2/1979 | Van Ostrom | 123/179 H |
| 4,300,491 | 11/1981 | Hara et al. | 123/179 BG |
| 4,312,307 | 1/1982 | Cooper | 123/145 A |
| 4,318,374 | 3/1982 | Yasuhara | 123/179 BG |
| 4,337,389 | 6/1982 | Bell | 219/511 |
| 4,359,643 | 11/1982 | Tadda et al. | 290/38 R |
| 4,375,205 | 3/1983 | Green | 123/179 H |
| 4,399,781 | 8/1983 | Tsukasaki | 123/179 H |
| 4,466,393 | 8/1984 | Bell | 123/179 H |
| 4,512,295 | 4/1985 | Hanson | 123/145 A |
| 4,516,543 | 5/1985 | Abe et al. | 123/179 H |
| 4,607,153 | 8/1986 | Ang et al. | 219/497 |
| 4,658,772 | 4/1987 | Auth et al. | 123/145 A |
| 4,725,711 | 2/1988 | Minegishi et al. | 123/145 A |
| 4,862,370 | 8/1989 | Arnold et al. | 701/113 |
| 4,939,347 | 7/1990 | Masaka et al. | 219/492 |
| 5,063,513 | 11/1991 | Shank et al. | 701/36 |
| 5,158,050 | 10/1992 | Hawkins et al. | 123/145 A |
| 5,241,929 | 9/1993 | Grassi et al. | 123/145 A |
| 5,287,831 | 2/1994 | Andersen et al. | 123/179.3 |
| 5,307,701 | 5/1994 | Thonnard | 74/7 E |

(List continued on next page.)

*Primary Examiner*—Jacques H. Louis-Jacques
*Attorney, Agent, or Firm*—Watts, Hoffmann, Fisher & Heinke, Co., L.P.A.

[57] ABSTRACT

An integrated electronic starting control system module for diesel engines which provides unique packaging with integration of a multiplicity of features previously unavailable or available only in separate control modules. Integrated into one modular device are improved glow plug and starting system control, monitoring, protection, and diagnostic features. These features for rendering improved glow plug control and diagnostics include: Microprocessor control, adaptive control algorithms, engine analog temperature sensing for glow plug operational compensation, over temperature shut down protection, system glow plug voltage sensing for glow plug operational compensation, timers for control of glow plug operation and duty cycles, sensing of glow plug current for protective shutdown, control relays and/or solid state switches for control of glow plug current (s), manual override control, load dump voltage spike avoidance circuitry based upon alternator output speed, system monitoring with diagnostics communication capability.

52 Claims, 10 Drawing Sheets

U.S. PATENT DOCUMENTS 5,327,870 7/1994 Boisvert et al. .................... 123/145 A
5,413,072 5/1995 Andersen et al. .................. 123/145 A
5,507,255 4/1996 Boisvert et al. .................... 123/145 A
5,570,666 11/1996 Rymut et al. ....................... 123/145 A
5,729,456 3/1998 Boisvert et al. .......................... 701/99

ELECTRICAL STARTING SYSTEM FOR DIESEL ENGINES

CROSS REFERENCE TO RELATED APPLICATIONS

The present application is a continuation-in-part of patent application Ser. No. 08/931,470 entitled "Voltage Monitoring Glow Plug Controller" filed Sep. 16, 1997 (now U.S. Pat. No. 6,009,369) which is a continuation-in-part of application Ser. No. 08/508,063 filed Jul. 27, 1995 (now U.S. Pat. No 5,729,456) which is a continuation of application Ser. No. 08/042,239, filed Apr. 1, 1993 (now U.S. Pat. No. 5,570,666) which is a continuation of application Ser. No. 07/785,462, now abandoned.

FIELD OF THE INVENTION

This invention relates in general to the field of automotive vehicle electrical systems, devices, and controls and in particular to improvements in control, performance, diagnostics, monitoring, adaptability, and compensation pertaining to glow plugs, starter motor actuation, and battery power application for diesel engine applications.

BACKGROUND ART

The present invention is intended for use in an environment of a self-propelled vehicle or other piece of equipment which is powered by a known form of internal combustion engine. The invention is preferably designed for use in connection with a vehicle or other equipment powered by a diesel engine Vehicles having diesel engines include heavy-duty military and commercial vehicles such as trucks, buses, infantry vehicles, tanks, tractors, bulldozers, and others. Because such vehicles can be operated by various operators having different skill levels, considerable warning and protection equipment is incorporated into such vehicles. This warning and protection equipment includes means for informing an operator of the operations and conditions of certain vehicle and engine components. Additionally, diesel engines are used in a multiplicity of other applications such as trains and electricity generator sets, which all require glow plug control systems.

Diesel engines have no spark plugs or spark ignition but, rather, rely primarily upon compression ratios higher than gasoline spark ignition engines with associated compression heating, residual engine heat from prior combustion, and ambient temperature to a lesser degree for creation of combustion conditions and temperatures sufficiently above the flash point of the diesel fuel which when injected under high pressure into the vehicle combustion chambers will spontaneously ignite so as to burn completely. The fuel/air mixture of a cold diesel engine will not ignite and/or run efficiently. Varying conditions (some widely varying) including: Engine temperature, ambient air temperature, ambient air absolute density, mass air flow, engine compression ratio, and fuel flash point temperature (being also some interrelated function of the above variable conditions) require various amounts of supplemental heat to be added to the combustion chamber prior to and during engine cranking and warmup to enable fuel ignition with sufficient combustion for engine operation during engine cranking conditions and cold engine warm up operation. To assist in bringing the combustion chambers above the necessary minimal operational temperature and/or to supply a source of combustion chamber ignition temperature, diesel engine glow plug heaters, otherwise called glow plugs, are employed.

Excessive glow plug power energization time causes higher than desired glow plug temperatures which can result in significantly shortened life of the glow plugs, in addition to wasting of energy and unnecessary long time before the engine can be started. Insufficient glow plug power ON time will cause lower than desired glow plug temperatures and reduced supplemental heat which can result in: Inability to start engine, excessive cranking time, starter motor wear, undesirable hydrocarbon exhaust emissions, white smoke of incompletely combusted fuel, increased fuel consumption, With many controllers, when a single glow plug burns out to an open circuit, the other glow plugs subsequently operate with slightly higher voltage resulting in an increased chance for a second glow plug to burn out to an open circuit, resulting in an additional higher voltage, resulting in an additional chance for a third glow plug to burn out, and so on such that the cycle can potentially continue until all of the glow plugs are burned out or have their life significantly shortened by excessive temperature due to operating at higher than anticipated voltages with glow plug controller types having fixed preglow and afterglow times.

One of the most important variables contributing to glow plug heating is the applied glow plug voltage from the vehicle's electrochemical storage battery. During engine operation the output voltage and current from the alternator charging system in parallel with the battery typically lowers the net power supply system impedance while increasing the net power supply system voltage. The power supplied to a fixed value of resistance is proportional to the square of the applied voltage, so the significant range of voltages potentially applied to the glow plugs due to battery condition, voltage regulation of alternator output, alternator speed, and vehicle electrical load regulation effect is one very important variable which can be compensated for by varying the durations of preglow time, afterglow I time, afterglow II time, duty cycle ON times, and cycle period times so as to maintain more optimal glow plug temperatures. Fixed preglow and afterglow times cannot optimally control the cycling glow plug temperatures based upon the number of variables which significantly affect the need for versus the production of glow plug heat.

Diesel powered vehicles are operated by individuals with widely varying knowledge levels of glow plug heater control system functional operation and with simple glow plug control systems there exists the potential for inadvertent and/or intentional system misuse by the operator thus automatic control is needed to safeguard against potential damage and/or inefficient operation. Abnormal human-controlled repeated cycling of the run/start switch can, in some cases with typical fixed glow plug timer functions, energize successive fixed preglow times thus potentially resulting in excessive glow plug energization with excessive glow plug temperature causing a resultant reduction of glow plug life. Typical simple fixed timer based glow plug controllers are incapable of optimal control of glow plugs given the number and range of natural and human variables affecting the system.

When the RUN/START switch is switched to OFF the glow plugs are typically immediately de-energized as the relay contact between the alternator and the battery is opened. This produces a race situation. If an alternator to battery control relay contact opens before the glow plug control relay contact then an alternator-sourced load dump occurs causing an inductive energy dump into the wiring. Glow plugs typically draw approximately 150 A of current which, when sourced solely from the alternator, can produce an electronic component damaging high energy inductive voltage spike of over 100 V causing electrical noise transients and damaging energy dissipative arcing of associated control relay contacts as they switch open.

Glow plug control is of vital importance to the function of diesel engine performance. Glow plugs are considered to have limited operational life and are somewhat costly to replace. Various glow plug and engine starting controllers with simple temperature and timer based functionality exist in the market. In various ways these existing systems fall short in the area of comprehensive control functions and features including: Optimal control of glow plug operation for maximum glow plug life, monitoring and protecting of glow plug operation, and load dump protection. Typical glow plug control systems offer minimal or no diagnostic monitoring functions to indicate electrical characteristics of specific open or short glow plugs and/or potential burn out based upon changing and/or abnormal electrical characteristics. Increasing demands for improvements in reliability, performance, efficiency, engine protection, electrical system protection, system monitoring capability, system diagnostics capability, and environmental pollution reduction all support the need for development of significant improvements to functionality of glow plug control devices and systems.

SUMMARY OF THE INVENTION

The present invention includes improved circuitry which integrates and incorporates into a single engine electronic starting system (EESS) a multiplicity of desirable characteristics for implementing the safe, reliable and efficient operation of the components of a diesel engine electrical control system.

A preferred embodiment of the present invention utilizes a microcontroller as an integral part of its control circuitry thus enabling relatively sophisticated glow plug and other functional algorithm control, monitoring, memory, diagnostics, reprogramability (as for example at various service increments of specified numbers of hours and/or miles of engine life with anticipated subsequent loss of engine compression), precise unit to unit repeatability, and even self adaptive control based upon various sensor and electrical inputs.

The preferred embodiment of the present invention is for use with a motor vehicle diesel engine having one or more glowplugs for maintaining temperature control of one or more diesel engine combustion chambers. The exemplary embodiment includes a housing supported by the motor vehicle and including a connector for routing signals from a vehicle mounted power source that energizes the glowplugs into said housing. A monitor circuitry supported within a housing interior provides an indicator signal corresponding to a voltage applied to the one or more glowplugs. A programmable controller supported within the housing interior is coupled to the monitor circuitry and produces a control output for supplying energy to the glowplugs. A switching device supported within the housing interior is coupled to the control output from the programmable controller and energizes the one or more glow plugs in a controlled time sequence prior to initiation of combustion in the diesel engine. A maintenance circuit that is also supported within the housing interior maintains power to current drawing loads of the motor vehicle after removal of an ignition signal.

The sensed input variables can include battery voltage, glow plug voltage(s), glow plug current(s), engine temperature based upon algorithms which can correct for sensor hysteresis and time lag, alternator output, engine speed, engine operational hours. These inputs are used to control on and off glow plug cycling using open loop control and/or closed loop feedback control of glow plug energization to maintain glow plug operation within an optimal temperature range specific to engine system operational conditions. Limitations associated with the simple voltage comparisons and computations of the analog and digital elements of non-microcontroller based circuitry are avoided. Timing tasks are converted from analog to digital circuitry and are incorporated in timing loops within the microcontroller software. Temperature, time, and voltage based drift characteristics associated with using RC timing elements are avoided. Overall, microcontrollers as control circuits provide improvements over some non-digital components and elements which can often exhibit undesirable performance characteristic variations based upon temperature, time, and applied voltage. The most significant and practical system inputs are those of engine temperature, glow plug voltage, glow plug current, and alternator speed.

The glow plug controller can modify the operation of the glow plugs in response to fixed and/or adaptive functional algorithms based upon various inputs from potentially diverse digital and/or analog sources. The glow plug controller can compensate to some extent by altering operating times, periods, and duty cycles of the glow plugs primarily based upon engine temperature and glow plug voltage. Although a preferred embodiment keeps the number of inputs to just a few, there are numerous optional inputs which can also be used for additional compensation control algorithm routines for glow plug operation including such variables as: Total accumulated engine operating time, total vehicle mileage, total accumulated fuel consumption, cylinder compression ratios, ambient air temperature, ambient air density, ambient air pressure, engine cranking speed, engine torque, engine power, engine revolutions, mass air flow, exhaust gas temperature, exhaust gas composition, fuel type, functional combinations of the above, and the like.

In accordance with the invention, high voltage spikes, whether from glow plug or other load dump, has been very significantly reduced by latching on the load dump control relay and monitoring engine speed via the alternating voltage signal produced at the alternator field R tap and delaying battery to alternator electrical connection unlatching until after the alternator is sufficiently reduced in speed such that all alternator sourced load currents are reduced below that level which can cause any significant harm by load dumping.

Some of these variables can optionally be automatically accumulated by the controller, for example accumulated engine operating time. Some can optionally be entered by the operator, for example, by a manual switch or variable setting ranging from non-winterized to full winterized fuel type. Some information can optionally be updated in memory by service techniques, examples being, resetting select memory and entering cylinder compression readings. Some information can optionally be communicated to the microcontroller via a bus multiplex/demultiplex communication system as further explained. Some operational changes can optionally be implemented by service reprogramming and/or switch setting changes of the microcomputer at specified service mileages and/or times, examples being, changing glow plug types (resistances) and changing hardware and software over from a single glow plug load output system to a multiple controlled output system. Self adaptive algorithms can optionally be based upon these and related various monitored operational parameters pertaining to ambient conditions and/or engine operation. The controller can compensate for the above-mentioned by altering preglow time, altering afterglow I on-time duty cycle, altering afterglow II on-time duty cycle, and altering afterglow cycle periods for altering glow plug heat and temperature sufficient to maintain sufficient engine starting and warmup.

DETAILED DESCRIPTION OF EXEMPLARY EMBODIMENT OF THE INVENTION

Figure 1:
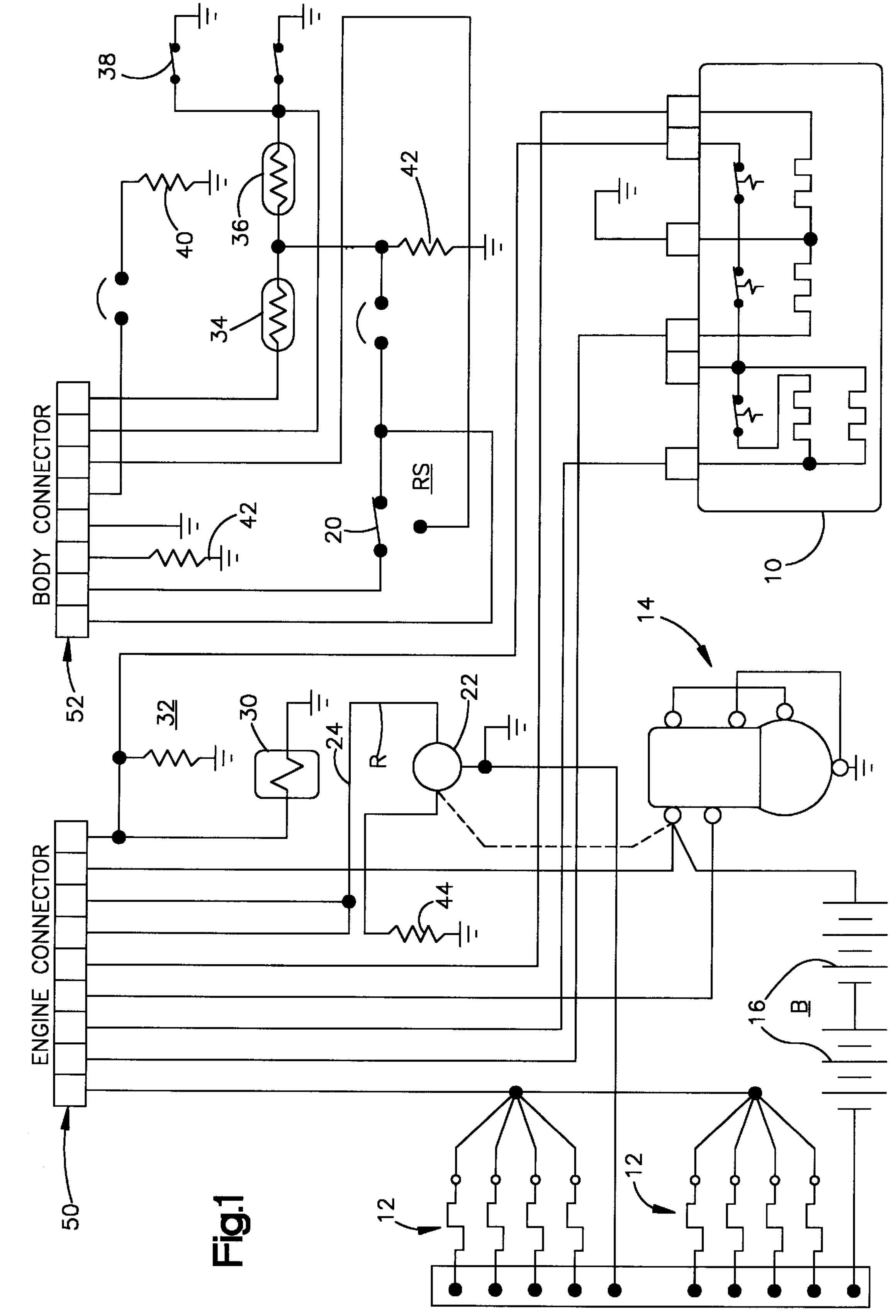
FIG. 1 is a partial schematic of the major electrical components of a diesel engine electrical system. This system shows a glow plug controller having integral thermal switches for control of glow plug actuation.

FIG. 1 is a schematic showing the major electrical components of a diesel engine electrical system and associated peripheral equipment which form an environment for practice of the present invention. This particular system shows a glow plug controller 10 having integral thermal switches for control of glow plug actuation. The items illustrated in FIG. 1 do not form part of the present invention per se, but rather are known components for reference in describing the present invention operates.

On the left side of FIG. 1 is a column of eight glow plugs 12. Operation of the glow plugs is governed by the glow plug controller 10. An electric starter motor 14 with associated switching and electrical power contactor, is provided for starting the engine. Two batteries 16 are provided for selectively actuating the starter motor 14 and for providing DC electrical power for operating other electrical components of the vehicle and for peripheral components of the engine as needed. The vehicle batteries provide a nominal 24 VDC, although the vehicle typically operates at 28 VDC while the engine is running. Preferably, two 12 VDC batteries in series are provided.

A run/start switch 20 is provided for switching power to the vehicle ignition circuitry and for selectively actuating the starter motor 14.

An alternator 22 driven by the engine, provides electrical power for charging the batteries 16 and for providing electrical power to the vehicle's loads. The alternator 22 has an R tap 24 connected to the alternator's field coil.

Energization of a fuel solenoid 30 governs flow of fuel to the engine.

A fan clutch circuit 32 electrically engages and disengages the clutch of an electric motor driven engine cooling fan.

When the run/start switch 20 is in the RUN or START position two lamps 34, 36 can be enabled given the following conditions. A wait-to-start lamp 34 provides a visual indication to an operator when a glowplug preglow cycle is occurring and it would thus be inappropriate to try to start the diesel engine. A brake warning lamp 36 indicates to the operator when a park brake switch 38 is closed which indicates that the vehicle parking brake is set. The brake warning lamp 36 also indicates when the start solenoid is energized. A brake pressure switch 39 provides an indication to the operator when a predetermined amount of force is applied to the service brake pedal.

The electrical system of the engine operates several types of electrical loads. One such load is a heater motor 40. Lighting loads are connected to a load generally indicated by the reference character 42. Certain miscellaneous electrical vehicle loads are indicated by the resistor at reference character 44. Interfaces for connecting the known components of FIG. 1 are provided by an engine connector 50 and a body connector 52.

Figure 5:
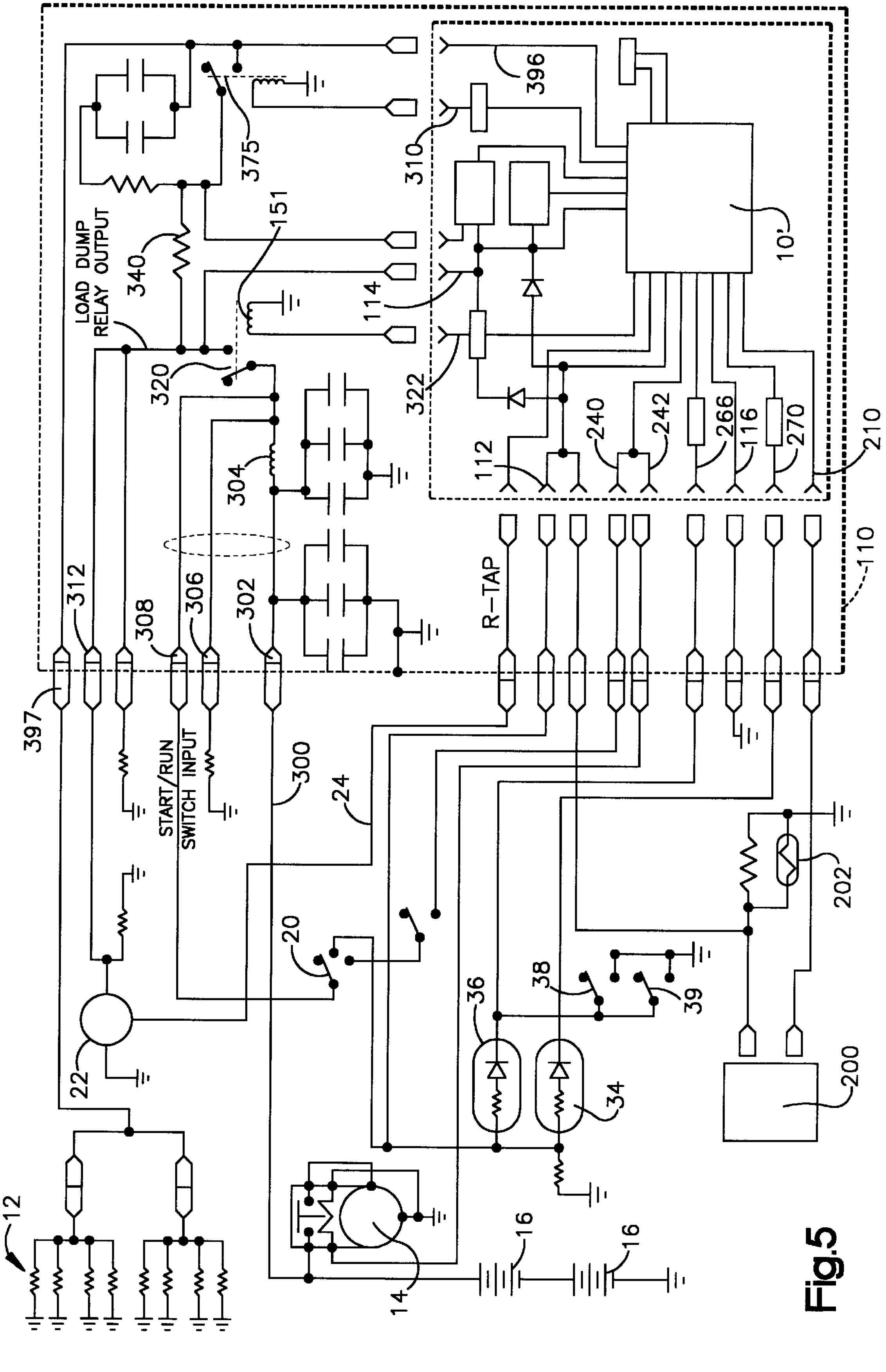
FIG. 5 is a block wiring diagram of the electronic starting system of FIG. 4 that includes a large block representing the protective control box having a smaller inner box representing a glowplug subassembly which is further detailed in the main electronic circuit board schematic of FIG. 6.
Figure 6A:
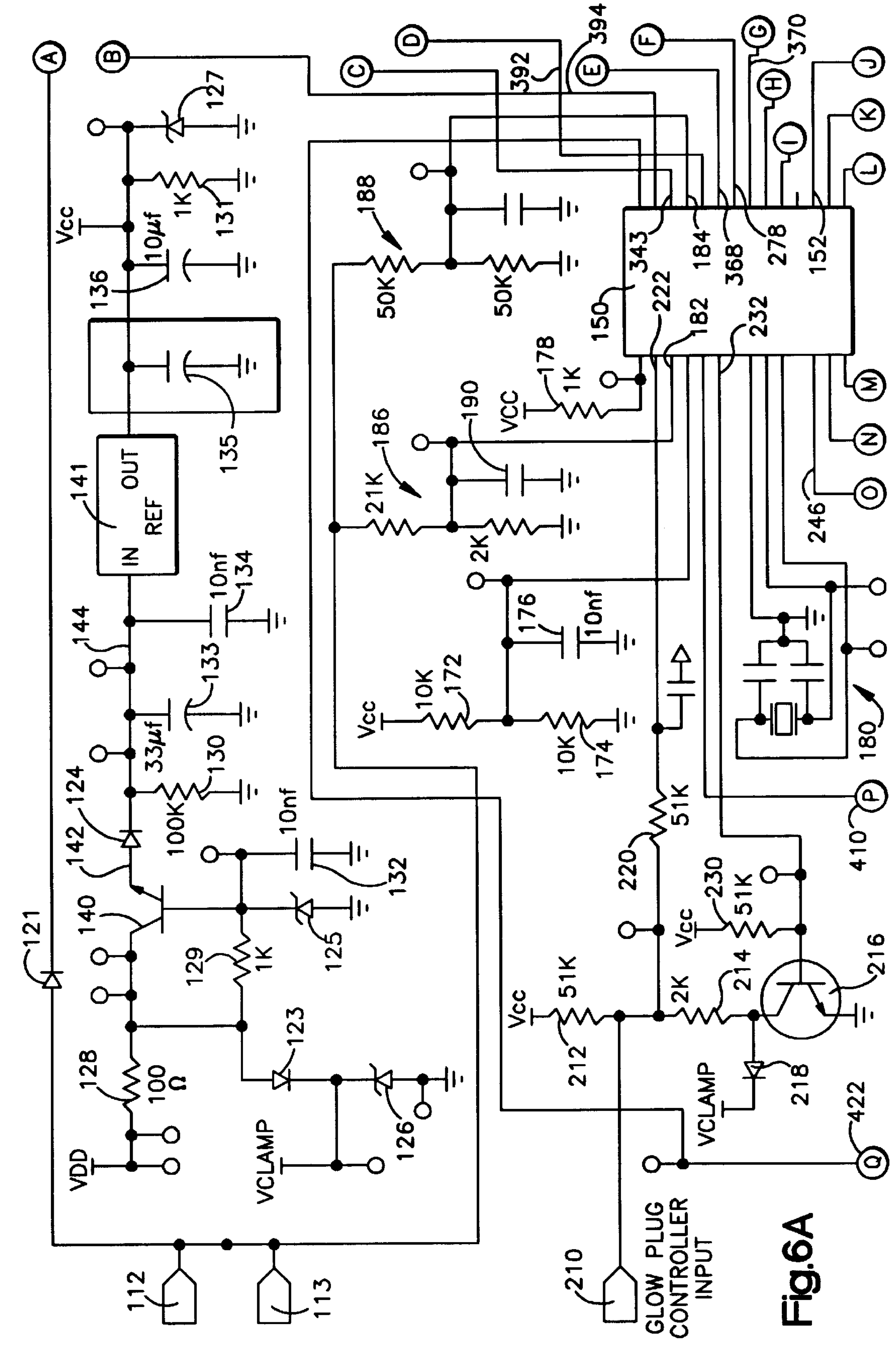
FIGS. 6A–6D show an electrical schematic of a glow plug controller portion of the EESS from FIG. 5.
Figure 6B:
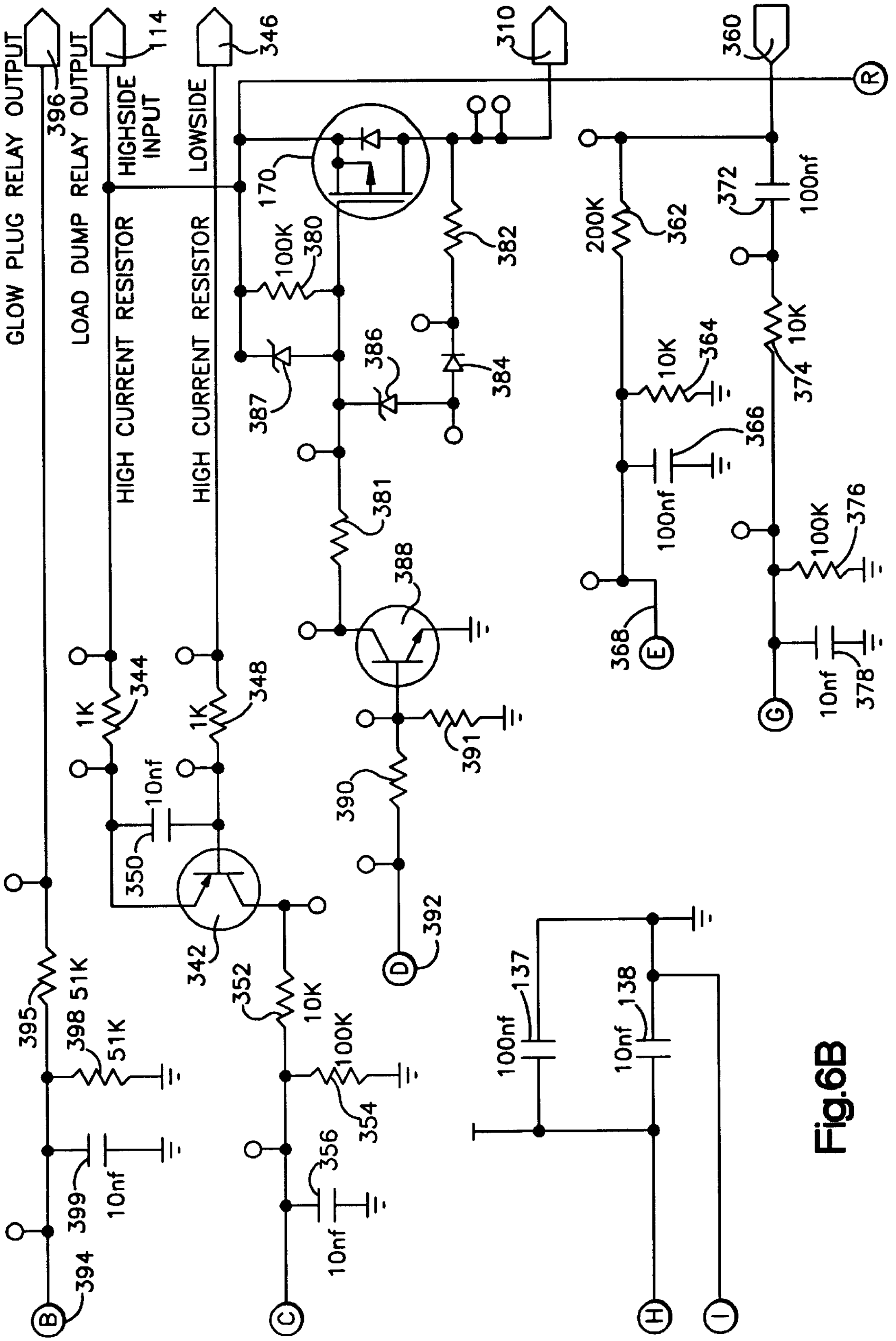
Figure 6C:
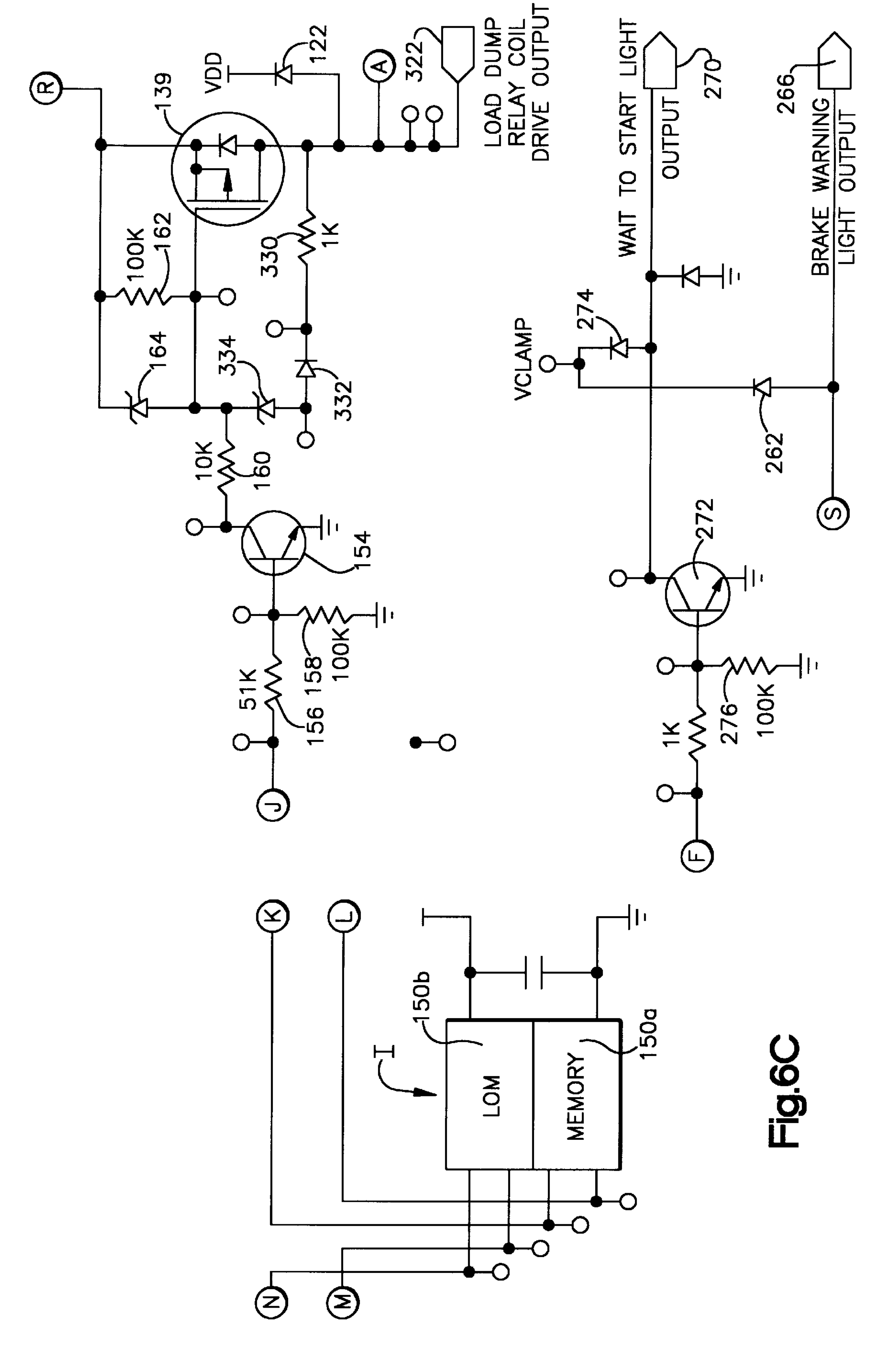
Figure 6D:
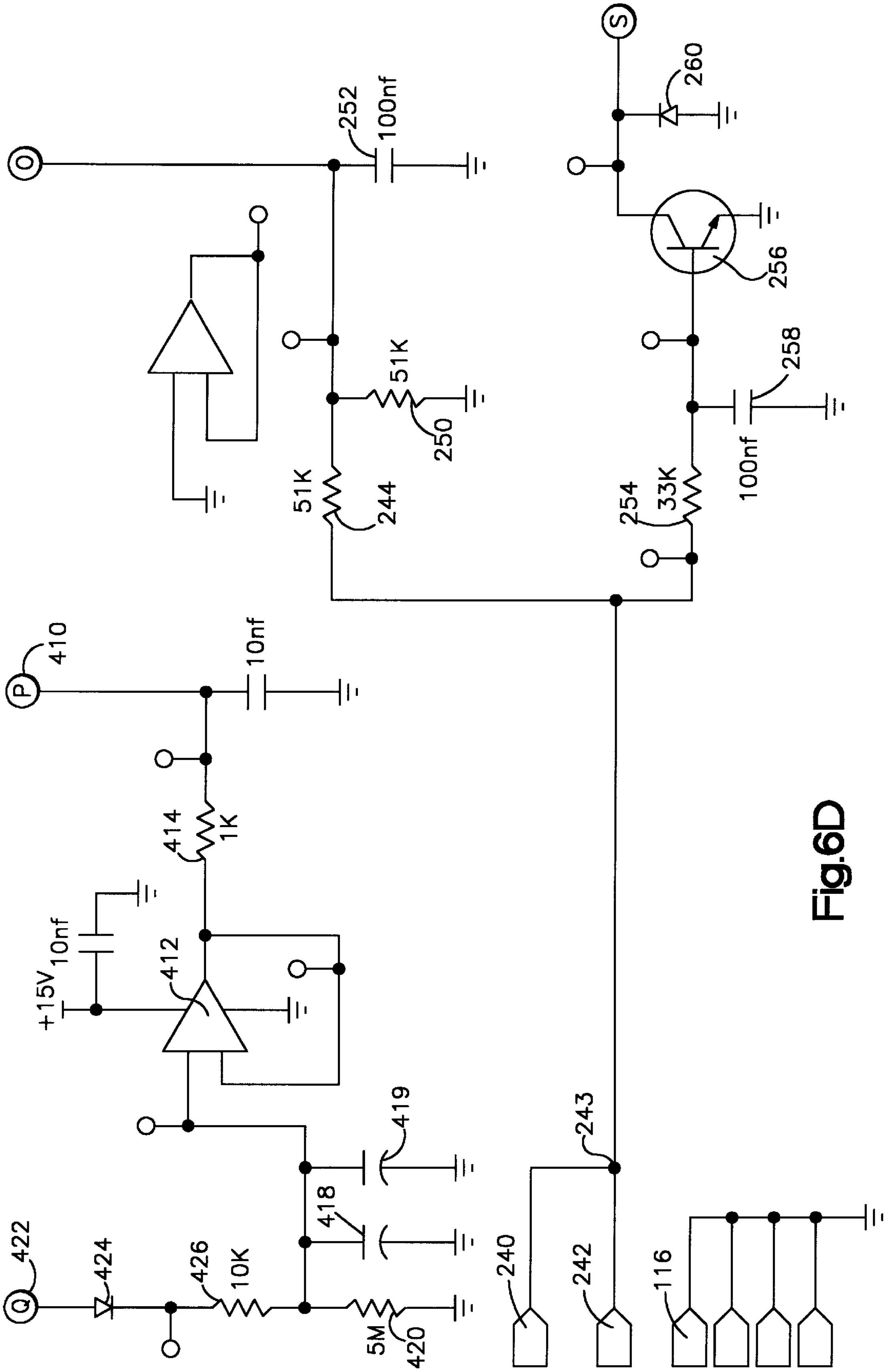
Figure 7:
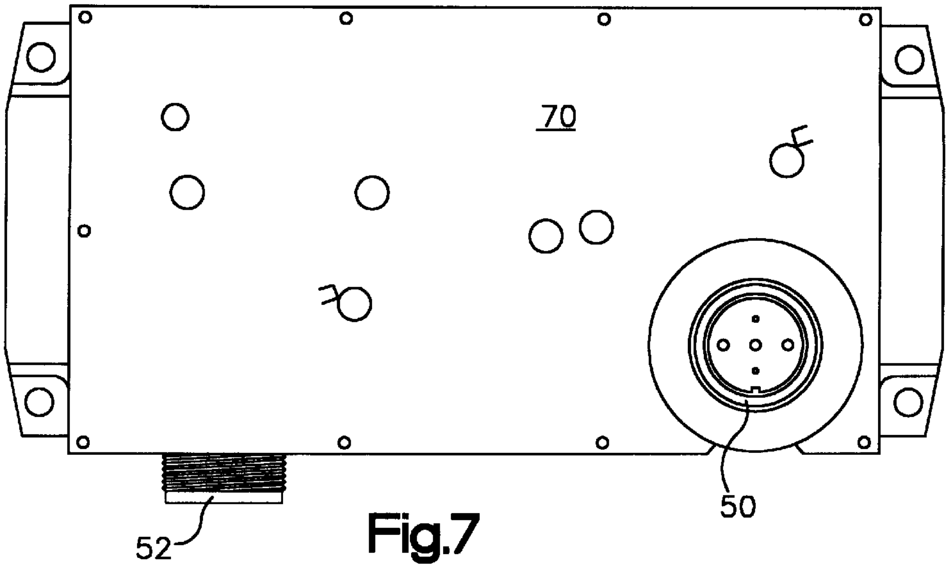
FIG. 7 is a top view of a housing for an electronic start system.
Figure 8:
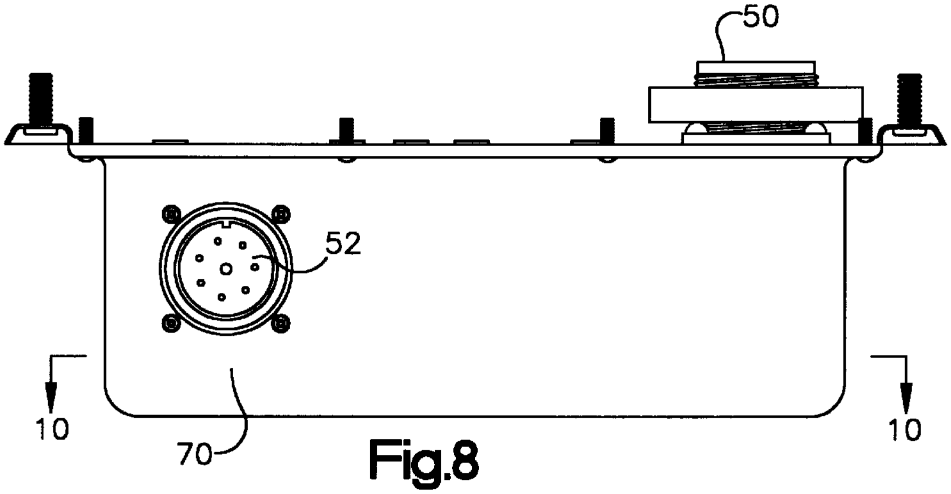
FIG. 8 is a drawing of the side view looking onto a body connector showing exterior mechanical aspects of the electronic start system.
Figure 9:
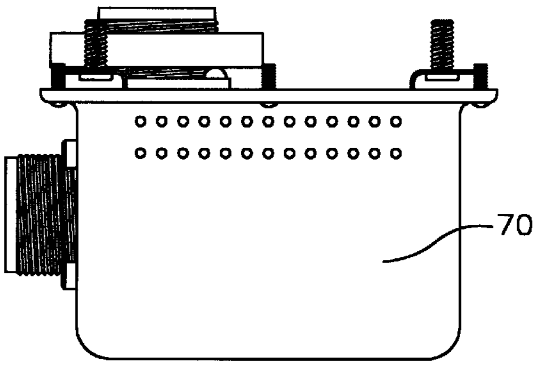
FIG. 9 is a drawing of a side view showing both the body and engine connectors as well as exterior mechanical aspects of the electronic start system.
Figure 10:
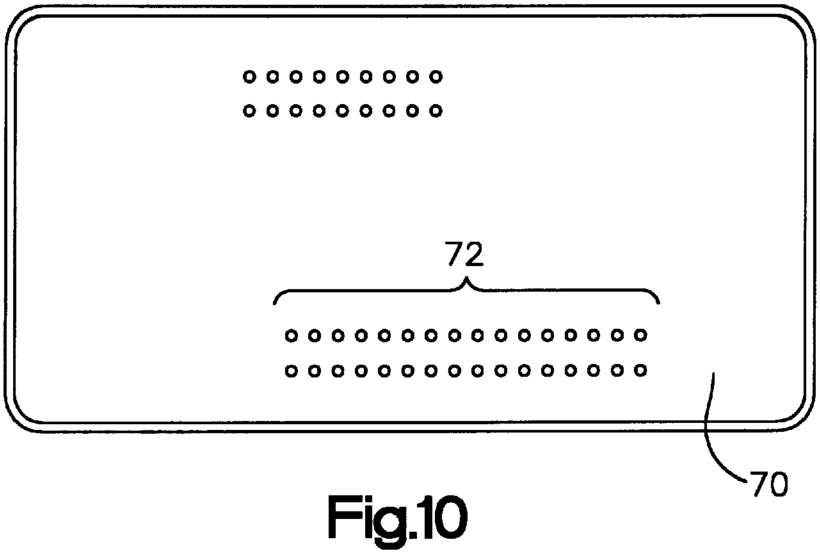
FIG. 10 is a section view showing optional ventilation holes in the cover.

FIGS. 3–6 show the presently preferred embodiment of electronic circuitry for implementing the invention. FIG. 5 contains a block diagram including power control relays for glow plug and load dump, terminal wiring connections of an electronics printed circuit board, engine terminal connector 50, body terminal connector 52, associated vehicle electrical loads, and associated wiring.

FIGS. 6A–6D depict the electronic schematic of the glowplug control subassembly from FIG. 5. The majority of the following disclosure stems from details of the electronics of FIG. 6. An alternative preferred embodiment (not shown) of the EESS uses at least one solid state power switch, and most preferably one solid state switch for each glow plug, in place of an electromechanical glow plug control relay.

The preferred embodiment of the present invention is for use with a motor vehicle diesel engine having one or more glowplugs 12 for maintaining temperature control of one or more diesel engine combustion chambers. The exemplary embodiment includes a housing 70 supported by the motor vehicle and including a connector for routing signals from a vehicle mounted power source that energizes the glowplugs into said housing. A monitor circuitry that is preferably supported within a housing interior to provide an indicator signal corresponding to a voltage applied to the one or more glowplugs. A programmable controller 150 supported within the housing interior is coupled to the monitor circuitry and produces a control output for supplying energy to the glowplugs. A switching device supported within the housing interior is coupled to the control output from the programmable controller and energizes the one or more glow plugs in a controlled time sequence prior to initiation of combustion in the diesel engine. A maintenance circuit that is also supported within the housing interior maintains power to current drawing loads of the motor vehicle after removal of an ignition signal. In accordance with one aspect of the invention the energization of the glow plugs is based on sensed engine temperature. An engine temperature sensing capacity of the invention can be implemented using various sensing devices of types including, but not limited to thermistors, positive temperature coefficient (PTC) resistors, negative temperature coefficient (NTC) resistors, resistance temperature devices (RTD), temperature sensing diodes, integrated circuit sensors, bimetal devices, and gas pressure bulbs. Optional algorithms and/or circuitry implemented using the glowplug controller can give predictive correction to actual engine block and/or cylinder head temperature based upon known, empirically determined, and/or actively determined hysteretical and time lag nature of various types and locations of temperature sensors.

Optional determination of actual glow plug temperatures for interactive adaptation of glow plug energization timing control can be performed and correlated by circuitry which can monitor glow plug resistance during on and/or off times by one of various calculation methods including: Current versus voltage, voltage for a fixed current, current for a fixed voltage, voltage in a resistive voltage divider, and time based decay with capacitive source. Alternatively, a relatively expensive integral platinum resistance temperature device could be incorporated into a glow plug design with at least one additional electrical terminal connection for resistance monitoring. Alternatively, a relatively expensive optical fiber could be incorporated into a glow plug design with termination at detection circuitry which monitors the characteristic emission spectra for glow plug temperature determination. One resistance determination circuit, rather than multiple dedicated resistance determination circuits, can be switched among numerous glow plugs using various algorithms to determine resistance characteristics. Resistors have some temperature coefficient of resistance such that the absolute resistance and/or relative resistance changing with temperature and time can be empirically determined in a precise manner.

Glow plug resistance and performance has been observed to vary significantly from plug to plug. An optional feature of the invention is for power and/or calculated energy to be individually monitored and empirically correlated with glow plug temperature and also with engine temperature for adaptive control of glow plug energization times to reduce excessive glow plug temperatures. By this method using the assumption that the thermal heat coefficients of individual glow plugs are similar, it is also possible to measure average power to each individual glow plug for comparison against each other glow plug such that individual glow plug on times can be increased and/or decreased to the glow plug temperature for individual glow plugs.

A glow plug energization voltage signal is measured using analog to digital conversion (ADC) as a scaled down signal from at least one of various nodes including battery and the power relay terminal connected directly to the glow plug(s).

Glow plug current can be determined by various sensing methods including magnetic field sensing, solid state switches incorporating integral current sensing, open loop hall effect sensing with ferromagnetic circuits, closed loop hall effect sensing with ferromagnetic circuits, and resistive voltage drop (IR drop) of load current through a known value of a high current series resistor configured as a shunt conductor in parallel with a voltage sensing circuit. The preferred resistor for sensing currents of approximately 150 Amperes is configured as a rectangular conductor bar of a chosen metal of appropriate resistivity and dimensions such as to render resistive impedance in the range of twenty-five milliohms, keeping the size and mass reasonably small, but not so small as to cause excessive temperature rise. This series resistor can optionally be configured as an inductor having a ferromagnetic core and optionally with an inverse parallel freewheeling diode such that the device will exhibit a characteristic RL electrical rise time with rising current levels significantly slower than a resistive glow plug alone during the time of electromechanical contact bounce of the power relay.

Reliability of the relay electrical contacts can be enhanced by reduction of high load current during contact bounce time of contact closure. The preferred optional and more costly method of switching glow plug current using solid state switch(es) avoids the problems with and typical solutions to electromechanical relay operation and additionally enables controlled switching of slew rates during turn on and turn off of glow plug load currents for significant reduction of switching noise transients. Implementing simple changes in glow plug harness wiring allows use of multiple solid state switches. Independent glow plug switching control can thus be performed resulting in very significant reductions of peak load dumping magnitudes by algorithmically-controlled non-simultaneous switching of individual glow plug currents. Capability to independently switch individual glow plug loads enables determination of individual glow plug over and/or under load current draw as an input for adaptive control of energization times, individual glow plug fault condition deactivation without the necessity of shutting down the entire system, diagnostic code setting, and other functional monitoring features.

Alternator speed can be determined from the frequency of the alternating component of the voltage at the field coil R tap. This signal can be used for load dump protection and optional starter actuation lockout features.

The information to be determined from the above inputs and sensors is used by a microcontroller 150 for algorithmic processing and for output control of appropriate engine glow plug operation, load dump protection, and other suitable functions, The microprocessor can determine an optimum versus actual glow plug heat and temperature for engine operating conditions by measurement of indirect variables using closed loop feedback and empirical techniques. Analog signal and sensor information can be converted into digital information by separate interface circuitry or by an analog-to-digital converter (integral with the digital microcontroller) for computational processing with the digital control algorithm.

Outputs under control of the microcontroller and associated circuitry of the engine starting system include a wait to start lamp 34, a brake warning lamp 36, a single or multiple glow plug driver(s), alternator to battery relay driver, and run power for the heater motor. An optional functional system control output enables and disables the starter motor 14 via a starter coil drive circuit This optional enable/disable circuit can use the same alternator speed input circuitry as the preferred control feature of load dump and functionally can be algorithmically programmed to disable the starter motor during the glow plug preglow period and/or when the engine is running above some first speed during cranking and/or when the engine is running above some second speed not during cranking.

The electronic starting system utilizes output drive circuitry to energize the go wait-to-start lamp 34 during the pre-glow cycle of glow plug operation to indicate to the vehicle operator that the engine glow plugs 12 are operating in the pre-glow mode and engine cranking should be delayed. The wait-to-start lamp is only energized for a period of time in response to an ignition switch changing from its OFF to its RUN position and the GPC signaling the EESS for a pre-glow cycle to occur. When in the diagnostics mode the wait-to-start lamp is energized in a coded pulsing manner to communicate various fault codes to the vehicle operator.

The electronics starting system energizes the brake warning lamp 36 when a starter control relay is engaged. Also, when either the parking engaged brake switch or the brake pressure switch 39 are closed and run/start switch is in either the RUN or the START position the brake warning lamp 36 will be ON.

The electronics starting system can provide output run power for the heater motor (approximately 15 A load) when the run/start switch is placed in the RUN position. The heater motor output run power must be isolated from other run power circuits to prevent the vehicle diesel engine from a momentary run-on condition caused from heater motor regeneration when switching the run/start switch from the RUN position to the OFF position.

Sensing of both glow plug voltage and/or current is preferred to affect wider ranging functional control, monitoring, and protection functions over normal and abnormal glow plug operating characteristics. In an optional alternative embodiment the voltage applied directly to each glow plug (and/or all glow plugs as one) can be also applied directly to a heater element thermally integral with a bimetallic-type switch being also thermally integral with the diesel engine such that the bimetal switch in a stable operation will have switch closed time to enable glow plug relay energization thus affecting functional intrinsic regulation of glow plug ON times based upon both engine temperature and upon applied glow plug voltage. As a variant of this electrical voltage sensing method, the electrical current passing through a glow plug (or all glow plugs) can pass in series through a conceptually similar bimetallic switch heater, although being designed as a much lower resistance value and for much higher current than a voltage driven heater, thus also an additional measure of functional electrical short glow plug current limitation is imparted such that the glow plug short circuit on time would be significantly reduced as opposed to the method whereby only the glow plug voltage is sensed. An optional variant on this concept is to have two heaters on the bimetallic switch such that one is energized by glow plug voltage and the other energized by glow plug current. Another improved optional variant on this concept is to have one or more heaters on the bimetallic switch in thermal contact with the engine such that the heaters are provided with functional drive signals representative of glow plug voltage and/or current and/or calculated power from a control circuit such that the heater energization results in appropriately engineered on, astable, or off switching control of glow plug relay operation.

Increasing numbers of vehicle applications use or have available for use system multiplex (MUX) and demultiplex (DEMUX) data, control, and address bus lines at one or more communication nodes, possibly supported by a host MUX module, upon which some of or potentially all of the above listed optional input and/or output information is regularly available or can be made available on an as needed basis to the glow plug control microprocessor 150. In some cases data is periodically broadcast onto the MUX system, in other cases data is broadcast irregularly to the MUX system, and in other cases data is broadcast only when polled or requested. In general, the thermal time constants involved for glow plug heating and cooling are on the order of seconds, which is an order of magnitude or more the typical times required for a polling and receiving of MUX bus information from remote nodes, therefore a MUX system is generally suitable in terms of timing capability and technical feasibility for collecting various inputs from diverse locations and also for outputting signals to the power control module(s) to perform all of the functions described herein. Improved functions of the glow plug controller can be optionally be implemented via separate modules interconnected and communicating via system MUX node and/or by dedicated wiring for incorporating desired additional input and output functions, features, and capabilities such that system inputs, functional algorithm processing control, and power switching outputs as a system can be performed by discrete modules which are not necessarily physically integral or even proximal.

A desired function of the preferred embodiment of the invention uses a time memory function to disable or reduce the preglow on time heating mode if the engine run/start switch 20 when changed from OFF to RUN position has been in the OFF position for a short time after previous running or preglow heating. For example, if the run/start switch 20 has been off less than three minutes, the preglow cycle time is disabled, whereas greater off times will result in increasingly longer preglow cycle times. This prevents a human operator from activating the run/start switch OFF and ON repeatedly causing fixed preglow heating times to be repeated in close time succession possibly resulting in overheating damage to the glow plugs. The actual and preferred method of control measures a resettable analog voltage decay circuit via an analog to digital conversion as a digital input for use by the microcontroller which sets the preglow time in part thereupon.

A time out feature discontinues glow plug energization if the glow plug cycling has occurred for some period of time, perhaps four to five minutes, without cranking or starting the engine. This time out feature can limit the significant glow plug electrical current drain on the electrochemical storage batteries 16 and also extend the life of the glow plugs 12 should the run/start switch 20 be inadvertently left in the RUN position for an extended time without starting the engine.

As previously mentioned, an optional and preferred functional feature is the use of more than one glow plug control relay or solid state switch for switching power on and off to individual glow plugs or groups of glow plugs, ideally, at least one switch device for each glow plug. Note that individual control of glow plugs or several groups of glow plugs requires that the power wiring harness include multiple conductor nodes, one for each switched plug or group, rather than the typical single wire node.

Switching power to each glow plug independently allows for practical application of multiple solid state switches rated for currents in the 20 to 30 Amp range having additional benefits including: Small size; light weight; acoustic quietness, an order of magnitude increase in switching cycle reliability; no mechanical contact bounce; no mechanical contact bounce created field emissions; reduced switching transients by controlled slew of turn on and/or turn off; and improved capability for monitoring, diagnostics, and control. Multiple switches allow improved input measurement and output control of each individual glow plug or group thereof including such independent functions as. Temperature measurement, voltage measurement, current measurement, energization, deenergization, disabling due to excessive current and/or short circuit condition, disabling due to excessive temperature of switch and/or glow plug, monitoring and diagnostics of glow plug voltages and/or currents, and specific control of switching on and off of individual glow plugs or groups thereof at differing times for reduction of related switching transients and peak load dump magnitudes.

Use of a microcontroller 150 with software control algorithms, whether fixed or interactively adaptive, allows for completely independent and individualized control of switching for each glow plug or group thereof with fixed and/or varying switch control timing functions of preglow time, afterglow I and II times, afterglow cycle on times, afterglow duty cycle, afterglow cycle periods, and the like based upon: Glow plug thermal position(s) within the engine cylinder head (i.e. relative amounts of heat transfer between hot glow plugs and cooler incoming gases and to or from hot combustion gases affects glow plug heating characteristics is affected by the position of the glow plug within the cylinder head and gas flows); thermal position(s) of glow plug location in a specific engine cylinder head relative to other engine cylinders (i.e. middle engine cylinders heat up more quickly than front cylinders); and measured inputs of and/or calculated values for voltage, current, power, resistance, temperature, barometric pressure, engine age, associated cylinder compression ratio, ambient air conditions, and the like.

A preferred function of the glow plug microprocessor 150 is a fixed or variable delay after the ignition switch is changed from the RUN to the OFF position during the afterglow 2 cycle ON time (from engine running), until the alternator is at a sufficiently safe and low speed (and thus low output) as determined from the frequency component of the alternator R-tap connection, to disconnect the alternator to battery connection and/or to deenergize the glow plugs so as to reduce the potentially damaging and dangerous voltage spike generated by instantaneous discontinuation of high glow plug and/or other vehicle currents through the inductive coils of the alternator.

Battery voltage is applied to various vehicle loads through the EESS via a load dumping relay 320. The EESS provides protection against reverse polarity and also provides protection against high speed load dumping by monitoring frequency by means of the microcontroller 150. Glow plugs typically draw approximately 150 A of current which when sourced solely from the alternator can produce a potentially lethal and electronic component damaging high energy inductive voltage spike of over 100 V with associated production of an electrical noise transient and damaging energy dissipative arcing of associated relay contacts as they open.

Many electrical loads are connected to the alternator output so that when the battery connection to the alternator is dropped out immediately when the ignition key switch is changed from the RUN position to the OFF position the integral voltage regulator within the alternator maintains alternator field current such that the alternator can continue significant output load current. Switching off of high glow plug and/or other load currents when sourced solely from and through the inductive alternator is likely to cause a much higher voltage spike with a much more energetic relay contact arc than when switching of this high current when sourced solely from or in parallel with the electrochemical storage battery which acts as a voltage limiting source for the current. The energy stored in an inductor is equal to (2)(inductance)(square of current), inductance being measured in units of Henry, current being measured in units of Ampere, energy being expressed in units of Joule. It is readily seen that for currents on the order of 150 A, the stored inductive energy is significant and for an automotive nominal 12 Volt application can exceed 100 Volts with durations above 32 Volt for approximately 400 milliseconds. Load dump can be damaging to various vehicle components, including the voltage regulator which is typically integrated with the alternator, and can also be lethal to an electrically shorted human. For a nominal 24 V vehicle operating system, load dump spikes are even more of a voltage concern to vehicular electrical components and also to humans. Functional monitoring and controlled avoidance of the conditions which can lead to production of alternator sourced load dump of inductive energy spikes with associated voltage spikes can lead to very significant reduction of: Detrimental voltage stress on vehicle components, reliability reducing glow plug relay contact arcing, and potentially lethal conditions. An optional method to control load dump induced voltage spikes is to hold the alternator-to-battery power connection for a short period after the ignition key is switched to the off position while immediately dropping out the glow plug load so as to remove the glow plug load dump from being sourced solely by the alternator.

An optional function is inclusion of a starter motor lockout relay which will reduce the potential for engine and/or starter motor damage caused by actuating the starter motor with the engine running and/or by actuating the starter motor for too long once the motor starts and increases speed. This starter motor actuation lockout function is based upon input alternator speed and/or glow plug functionality via appropriate microprocessor control algorithms and an output control relay. It may be desired to lockout starter motor actuation during glow plug preglow time, otherwise the control algorithm should preferably determine the engine running condition and immediately change mode from preglow to afterglow to reduce the potential for excessive glow plug temperature. The on/off state of the engine is determined by the frequency of an AC signal produced by the engine alternator detected by improved frequency to voltage circuitry and by the condition of a run/start switch. When the frequency of the alternator R-tap is above some value, for example 65 Hz, and the starter relay is not energized, or when the frequency of the alternator R-tap is between two values, for example 125 Hz and 145 Hz, and the start relay is engaged, the starter is then disabled. The starter will remain disabled until the alternator R-tap frequency drops to some value, for example 10 Hz or below which indicates that the engine is sufficiently stopped so that is then safe for the starter to be engaged without significant potential for danger or harm to the engine. A relay within the protective control box is provided to engage and disengage the starter relay for the engine starter motor.

A diagnostic feature of the electronic start system notifies the vehicle operator that there is a system fault by flashing the wait-to-start lamp 34 at some rate, for example 0.25 seconds on and 0.25 seconds off. The diagnostic flash rate will only be displayed after the normal wait-to-start sequence has terminated either by afterglow timeout or afterglow duration limit timeout. If the run/start switch 20 is cycled to the OFF position, the diagnostic indicator will turn off. When the run/start switch is cycled to the RUN or START positions the fault indication will wait for the normal wait-to-start sequence to terminate before flashing an error. Once a fault indication has been reported (via the wait-to-start lamp), the EESS control will enter a diagnostic mode if the run/start switch is cycled between OFF and RUN for some specified number of times within some specified time, for example five times within five seconds. If, for example, fewer than five cycles occur within five seconds or five cycles occur in greater than five seconds, the diagnostic mode will not be entered. After entering the diagnostic mode, the wait-to-start lamp will flash a fault code that coincides with a particular failure. The fault code will be a sequence of flashes, for example from one through nine, with each number representing a unique fault condition. One sequence of flashes will be presented for each fault the control has encountered, i.e. one fault—one flash sequence; two faults—two sequences; or three faults—three sequences. The control will report a maximum number, for example three, faults while in a particular diagnostic mode. The flash sequences are presented as a flash being a lamp flash of typically 0.25 second and the space between flashes equal to typically 0.25 second. If multiple faults exist, there will typically be a one second time period (with the lamp off) between sequences. After the last code has been displayed, the series will repeat after typically a three second time period (lamp off). This display will continue indefinitely until terminated by again cycling the run/start switch to the OFF position. After the diagnostic mode has been exited the wait-to-start lamp is extinguished and the control will resume its normal functions. The control will have self programmable memory capability. An EE memory **150*a*** stores system parameters for use by the PCB portion of the EESS. It will also store information concerning the operation status and environment of the EESS. The following table defines what information will typically be stored for diagnostic purposes. The following list may be added to as required.

1. Maximum temperature unit has been exposed to while operating
2. Minimum temperature unit has been exposed to while operating
3. Maximum voltage unit has been exposed to while operating
4. Minimum voltage unit has been exposed to while operating
5. Operating temperature when last error condition existed
6. Operating voltage when last error condition existed
7. Last error condition code (maximum number of three stored)
8. Total number of load dump relay cycles
9. Total number of glow plug relay cycles
10. Total number of start cycles
11. Average of temperature read by EESS when vehicle started
12. GPC type that was last connected to EESS The electronic start system can incorporate additional features such as shielding, transient protection, and filtration of electrical noise over wide ranging frequencies (including zero Hz) and of interference types including: Conducted transients, electrostatic discharge, load dump, reverse voltage, magnetic fields, electric fields, and electromagnetic fields. Due to the typically sensitive and high frequency electronics within the control module and in cases of integral control and power switching within the same control module, it may be necessary to include shielding and/or filtration for protection of: Module components from each other, module components from outside sources of noise, and outside components from noise produced within the module. Additional concepts from ILM can include additional interface communication and control features allowing service monitoring of historical and present operation plus modification control of glow plug functional algorithm control parameters.

The electrical starting system is most preferably housed in a metal box housing 70 (FIGS. 7–10 ) that is rectangular in plan. The metal construction increases the durability, heat transfer, and electrical noise shielding characteristics of the housing 70. Depending upon the specific application the housing can be provided with ventilation apertures 72 or alternatively can contain encapsulation of all or some of the internal components for improved heat transfer, mechanical rigidity, and sealing against contaminants. In some applications conformal coating of the circuit board(s) is sufficient for protection against contaminants. For applications where serviceability is required, the printed circuits can optionally be implemented as one or more replaceable circuit board(s).

Detailed Description of Control Circuitry

Power Supply Circuit

A power supply circuit includes: RUN SWITCH INPUT at a terminal 112 via the body connector 52, a LOAD DUMP RELAY OUTPUT/HIGH CURRENT RESISTOR HIGH-SIDE INPUT (FIG. 6B) at an input terminal 114; a CHASSIS/COMMON at terminal 116 via the body connector 52; diodes 121, 122, 123, 124; zener diodes 125, 126, 127; resistors 128, 129, 130, 131; capacitors 132, 133, 134, 135, 136, 137, 138; field effect transistor 139; bipolar transistor 140, and a three pin integrated circuit (IC) voltage regulator 141.

Unregulated power supply voltage VDD is protected against reverse voltage by blocking diodes 121, 122. A resistor 129 limits current to the clamping regulator including the NPN bipolar transistor 140. A Diode 123 and the zener diode 126 provide protective voltage clamping to the collector of transistor 140, which with its associated voltage-regulating base components comprising resistor 129, zener diode 125, and capacitor 132 limits the emitter output voltage at node 142 to approximately +15.7 VDC relative to COMMON to protect voltage regulator 141 from overvoltage. An input 144 to the voltage regulator 141 receives current from node 124 via reverse voltage blocking diode 124. Resistor 130, electrolytic capacitor 133, and bypass capacitor 134 provide respective functions of loading, voltage filtering, and high frequency noise bypass from the input of regulator 141 to COMMON. The reference node for regulator 141 is connected to COMMON and its output voltage becomes the power supply VCC which is connected to COMMON by capacitors 135 and 136, resistor 131, and zener diode 127 to provide respective functions of filtering, loading, and voltage clamping. Bypass and/or filter capacitors at the input and output sides of voltage regulator 141 to COMMON help to prevent unstable voltage oscillations. The regulated voltage VCC is supplied to the microcontroller 150 and numerous other microcontroller related input and output circuits.

Load Dump Control Relay Control

The EESS 110 controls its own power supply by maintaining energization of the load dump relay coil 151 until both the run/start switch is switched to the OFF position AND alternator speed drops below some value below which a glow plug load dump induced voltage spike is unable to cause any significant harm. This function is performed by microcontroller 150 which drives the circuit which controls the FET 139 (FIG. 6C) via pin 152 as follows. The pin 152 drives the base of bipolar PNP transistor 154 via resistor divider 156, 158 to COMMON.

The collector of the transistor 154 is connected via a resistor 160 to pull down the gate of FET 139. The gate of FET 139 is also connected via both a resistor 162 and anode of zener diode 164 in parallel to the terminal 114 LOAD DUMP RELAY OUTPUT/HIGH CURRENT RESISTOR HIGHSIDE INPUT. By this circuit the gate of FET 139 is pulled up and held high resulting in biasing off of FET 139 and its output drive to LOAD DUMP COIL DRIVE OUTPUT unless otherwise pulled low by transistor 154 under microcontroller 150 control via a high output at pin 152. Inductive turnoff transients produced by the load dump relay coil are managed by associated electronic hardware for fast and protected turnoff of FET 139 similar to FET 170 as are further explained in more detail.

Microcontroller and Support Circuitry

The Microcontroller 150 is a PIC16C73A by Microchip Technology Incorporated, which is a complimentary metal oxide semiconductor (CMOS) integrated circuit (IC) which when its I/Os are not internally configured as TTL type logic inputs or Schmitt Trigger type logic inputs must not be allowed to electrically float at a high impedance state or have slowly changing voltage levels between defined logic states without the risk of unstable oscillation and/or erratic operation, therefore it can be seen that appropriate I/Os used as logic inputs have pull up and/or pull down resistors connected thereto as necessary. Microcontroller I/O pins designated as RA#, RB#, and RC#, # representing some number ranging from 0 to up to 7, are ports which have various types of internal electronic structure enabling various pin specific types of bi directional and tri state capability including: TTL input, Schmitt Trigger input, analog input, output a logical high value (pull up), output a logical low value (pull down), totem pole (pull up OR pull down), and output a high (Z) impedance virtual open circuit. (See manufacturer data sheet for details) I/O pins RA0/AN0, RA1/AN1, RA2/AN2, RA3/AN3/VREF, and RA5/AN4/SS (low) have the capability to input analog voltage values for A/D conversion into an 8 bit (256 resolution) digital representation based upon the successive approximation method where full scale is software selectable as either microcontroller 150 pin VDD or the voltage level on the pin RA3/AN3/VREF. In this case, the pin VREF is presented with a voltage divided representation of VCC via resistors 172, 174 with the representative analog signal to the microcontroller 150 being filtered by high frequency capacitor 176 to bypass shunt high frequency noise to COMMON.

Microcontroller 150 is powered at its pin labeled VDD by VCC and at its two pins labeled VSS by COMMON. Two COMMON nodes referred to analog and digital COMMON, respectively are tied together as a single common node as a last circuit manufacturing step to help protect sensitive circuits during assembly and are herein both simply referred to as COMMON.

Capacitors 137, 138 are placed between VCC and COMMON in close proximity to the microcontroller 150 as a low impedance source for fast switching current slewrate demand and as a high frequency shunt filter for power supply transients to provide a relatively noise-free voltage supply to the power supply inputs of microcontroller 150. These two different capacitors are used primarily because of their differing impedance versus frequency to give an improved response to that obtainable only with one capacitor.

A power down reset function of the microcontroller 150 is by connection of VCC via current limiting resistor 178 to pin MCLR(active low)/V.

The microcontroller 150 uses an external 4.000 MHZ oscillator 180 which is connected to microcontroller 150 at pins labeled OSC1/CLKIN and OSC2/CLKOUT. The Oscillator 180 is a three pin device consisting of a crystal oscillator with each of its two outputs terminated via integral capacitors to COMMON.

The Microcontroller 150 is coupled to an interface I (FIG. 6C) including an electrically erasable programmable read only memory (EEPROM) 93LC46B IC 150*a* made by various suppliers including Microchip Technology, National Semiconductor, and Motorola. This EEPROM is a low power CMOS IC non-volatile storage and retrieval memory for 64 words of 16 bit length designed for serial data input and serial data output. The EEPROM 150*a* is powered at its VCC pin by the VCC voltage and at its GND pin by COMMON. The microcontroller 150 has input/output (I/O) pins RC2, RC3, RC4, and RC5 connected to respective EEPROM pins CS, CLK(SK), DO and DI. CS represents a chip select. CLK represents serial data clock. DI represents serial data input and D0 represents serial data output.

The interface also includes a communications interface circuit 150*b* that allows the programmable controller 150 to communication with other vehicle controllers. As noted above motor vehicle applications can now make use of multiplex (MUX) and demultiplex (DEMUX) data, control, and address bus lines at one or more communication nodes, possibly supported by a host MUX module, upon which some of or potentially all of the above listed optional input and/or output information is regularly available or can be made available on an as needed basis to the glow plug control microprocessor 150 by means of the body connector. In some cases data is periodically broadcast onto the MUX system, in other cases data is broadcast irregularly to the MUX system, and in other cases data is broadcast only when polled or requested. In general, the thermal time constants involved for glow plug heating and cooling are on the order of seconds, which is an order of magnitude or more the typical times required for a polling and receiving of MUX bus information from remote nodes, therefore a MUX system is generally suitable in terms of timing capability and technical feasibility for collecting various inputs from diverse locations and also for outputting signals to the power control module(s) to perform all of the functions described herein. Improved functions of the glow plug controller can be optionally be implemented via separate modules interconnected and communicating via system MUX node and/or by dedicated wiring for incorporating desired additional input and output functions, features, and capabilities such that system inputs, functional algorithm processing control, and power switching outputs as a system can be performed by discrete modules which are not necessarily physically integral or even proximal.

Run Switch Input, Glow Plug Controller Power Output

The positive power input designated as RUN SWITCH INPUT, at terminal 112 via body connector is hardwired by the EESS circuit as GLOW PLUG CONTROLLER POWER OUTPUT at terminal 113 via engine connector for power supply to the glow plug controller, fan clutch circuit, and fuel valve solenoid. Power to operate the EESS is initially provided via terminal 112 thereafter also via terminal 114 after the load dump relay is closed. Inputs representing the effective electrochemical storage battery voltage are provided from the terminals 112, 113 to the microcontroller 150 at pins 182, 184 via filtered voltage dividers 186, 188. The pin 182 reads an analog voltage for conversion to eight bit digital resolution via a precision resistor divider network comprised of two resistors to COMMON, with the middle node as the signal filtered by high frequency capacitor 190 for bypass shunting of electrical noise to COMMON. This is the reference analog voltage signal that is representative of the glow plug operating voltage for purposes of compensating glow plug operation based upon power supply voltage. The pin 184 reads a digital voltage level via a resistor divider network comprised of two resistors from a center node to COMMON, with the middle node as the signal filtered by high frequency capacitor 192 for bypass shunting of electrical noise to COMMON. This logical signal is for the microcontroller 150 to monitor when the run/start switch is in the run or start positions.

External Glow Plug Controller Input

A GLOW PLUG CONTROLLER INPUT from an external glowplug controller 200 at a terminal 210 (FIG. 6A) via the engine connector from glow plug controller (with integral temperature sensor) output signal is also connected via pullup resistor 212 to VCC and via resistor 214 to the collector of NPN bipolar transistor 216, which has its collector tied to COMMON. To protect transistor 216, its collector is connected via diode 218 to VCLAMP, the clamped voltage at the cathode of zener diode 126. The terminal 210 is also connected via a resistor 220 to microprocessor input pin 222, which is also high frequency filtered by a bypass shunt capacitor to COMMON. The base of the transistor 216 is pulled up (turned on) to VCC by a resistor 230 and can be pulled down (turned off) by the microcontroller 150 by an output from pin 232. The microcontroller 150 can monitor the input at terminal 210 by selectively turning on and off the transistor 216 and reading the voltage at pin 222 which will be logical LOW and logical HIGH, respectively if there is no high or low signal, and thus a high (Z) impedance, driven on the terminal 210 from an external glow plug controller. Presence of a high signal (28 volts) is in one instance an input from the second glow plug controller of a sensed temperature above 50 degress F. Glow plug timing control can be performed by the external glow plug controller with integral engine temperature sensor and/or by the redundant integral glow plug control timing function capability inherent within the PCB control circuitry including microcontroller 150 software control algorithms using the terminal 210 only for input from an external temperature sensor 202. If the input 210 is only coupled to a temperature sensor the impedance of the input varies with temperature and hence the voltage at the input 222 provides a temperature signal.

Start Switch Input, Starter Coil Driver Output Brake Warning Light Output

A START SWITCH INPUT at terminal 240 via the body connector is interconnected with STARTER COIL DRIVE OUTPUT at terminal 242 via the engine connector. A node 243 interconnecting these two terminals 240, 242 is connected via a resistor 244 to microcontroller 150 at an input pin 246 which is also pulled down as a voltage divider to COMMON by a resistor 250 and which pin is also filtered by a high frequency capacitor 252 for bypass shunting high frequency noise to COMMON. The node 243 is also connected via a resistor 254 to the base of bipolar NPN transistor 256 having a base terminal that is also noise filtered by a high frequency capacitor 258 for bypass shunting high frequency noise to COMMON. The collector-emitter junction of NPN bipolar transistor 256 is protected against reverse polarity by parallel diode 260 having anode connected to COMMON and is protected against overvoltage by having its collector connected via diode 262 to VCLAMP. Transistor 256 also has its collector connected via anode of a diode 262 to VCLAMP and also has its collector tied via cathode of diode 260 to COMMON in both cases to protect it from voltage excursions. A BRAKE WARNING LIGHT OUTPUT is controlled by transistor 256 which is a low-side switch to illuminate the brake warning lamp (light emitting diode having an integral dropping resistor) as energized from the run/start switch being in the start position. Transistor 256 is in parallel with two vehicle single-pole single-throw normally open electromechanical switches 38, 39 actuated by mechanical park brake application or by hydraulic brake pressure application such that any one of the three can switch low the BRAKE WARNING LIGHT OUTPUT of terminal 266 via the body connector and thereby illuminate the brake warning lamp 36.

Wait To Start Light Output

A WAIT TO START LIGHT OUTPUT terminal 270 is connected via the body connector 52, as the lowside for the wait to start indicator lamp 34, which is an LED with a dropping resistor. The terminal 270 is connected to the collector of a bipolar NPN switching transistor 272, which is also connected via a diode 274 to VCLAMP to protect transistor the transistor 272 from high voltage. The base of the transistor 272 has a pulldown resistor 276 that is driven by the microcontroller 150 at an output pin 278. The wait to start lamp is exclusively controlled by microcontroller 150.

Battery Load Current Supply Input, Lighting Loads Output, Load Dump Relay Coil Drive Output, Start/Run Switch Power Output Load Dump Relay Output/High Current Resistor Highside, Vehicle Loads/Alternator A BATTERY LOAD CURRENT SUPPLY INPUT 300 (FIG. 9) via an engine connector terminal 302 is interconnected within the PCB in series with a load inductor 304 to an external LIGHTING LOADS OUTPUT via a body connector terminal 306 and a START/RUN SWITCH POWER input 308. A LOAD DUMP RELAY COIL DRIVE OUTPUT at a terminal 322 (FIG. 10B) is driven high to energize the load dump relay coil by the run/start switch being either in the run or the start position which puts battery voltage to terminal 112 which via diode 121 directly interconnects with terminal 322.

Once the load dump relay is activated and its contacts are closed, LOAD DUMP RELAY OUTPUT/HIGH CURRENT RESISTOR HIGHSIDE at terminal 114 and VEHICLE LOADS/ALTERNATOR via engine connection 312 (which are all names for the same electrical node) are connected via load inductor 304 to BATTERY LOAD CURRENT SUPPLY INPUT via engine connector 302. This load inductor 304 and a number of capacitors connected from terminal 302 to COMMON filter major current and/or bypass voltage transients so as to protect electromechanical contacts of load dump and glow plug relays upon opening and closure bounce, protect sensitive electrical components of the EESS, and reduce the magnitude of potentially damaging voltage transients which might be induced upon relay opening.

The switched on power condition of LOAD DUMP RELAY OUTPUT at terminal 114 via resistor 162 biases off the gate of its controlling field effect transistor (FET) 139 to turn off drive to LOAD DUMP RELAY COIL DRIVE OUTPUT unless microcontroller 150 terminal 152 is maintained in a driven high state to turn on transistor 154 thus pulling down the gate of FET 139 thus holding it in conduction to maintain output power from the load dump relay 320. Removal of the initial power supply via RUN SWITCH INPUT at terminal 112 does not remove the latched power now supplied via terminal 114 until alternator speed is below some specific value to protect against potential voltage spikes produced by sudden discontinuation of significant electrical load sourced solely from the inductive alternator. The drain to gate junction of FET 139 is protected from battery supply overvoltage by zener diode 164 in parallel with resistor 162 with the anode at the gate and the cathode at the drain OUTPUT via the engine connector.

The Microcontroller 150 can turn off the load dump relay latch by turning off field effect transistor (FET) 139. This has the effect of removing the LOAD DUMP RELAY OUTPUT voltage which has been conducted to drive both LOAD DUMP RELAY COIL DRIVE OUTPUT at terminal 322 and also voltage supply to VDD via diode 122. FET 139 is turned off by the signal from microcontroller pin 152 changing from high to low, which via a network of two resistors 156, 158 to COMMON then pulls down the base of bipolar PNP transistor 154 thus turning off the conduction by which the collector of transistor 154 via resistor 160 was pulling the gate of FET 139 low to bias FET 139 on, such that the gate of FET 139 is then pulled up by resistor 162 which biases 139 off and discontinues electrical conduction to LOAD DUMP RELAY COIL DRIVE OUTPUT.

In the case where the microcontroller 150 determines from the voltage drop across the high current resistor 340 that a high current fault condition exists it is important to quickly discontinue the high glow plug (typically 150 A) current through the load dump relay before some dangerous amount of fault energy causes or initiates major destruction of vehicle components, Instantaneously attempting to switch power off to the drive coil of the glow plug relay results in a characteristic transient inductive carry over current and/or voltage spike production across the oil. One solution would be to place a free-wheeling diode in inverse parallel with the drive coil to reduce the inductive voltage spike produced, but this allows the carry on current decay to last longer, resulting in a relay contact opening time that is milliseconds longer than desired. The combination of components across FET 139 clamps the inductive carry over current-produced voltage spike to a higher value than the typical free-wheeling diode allows to thus discontinue the inductive carry over current more quickly thereby also effecting a quicker electromechanical relay contact opening. The inductive transient current is also used to safely bias the FET 139 to maintain a controlled turn-off which will also not damage any components of the EESS. The components which clamp the inductive voltage spike comprise resistor 330, diode 332, zener diode 334, and zener diode 164. Negative voltage transient protection of the drain to gate and gate to source are also provided by these four components. The inductive current spike drawn through zener diode 164 biases FET 139 on, thus maintaining a turn off rate within the voltage rating capability of FET 139. This turn off method produces a significantly quicker and controlled turn off of FET 139 thus assuring a greater degree of protection against a current fault condition when detected by an excessive voltage drop across the load dump relay 320.

Load Dump Relay Output/High Current Resistor Highside, High Current Resistor Lowside Monitoring for excessive load current across the high current resistor 340 is done by having its voltage drop turn on bipolar PNP transistor 342 to send a logical high signal to microprocessor 150 via pin 343. The collector of transistor 342 is driven by LOAD DUMP RELAY OUTPUT/HIGH CURRENT RESISTOR HIGHSIDE via resistor 344. The base of transistor 342 is driven by a HIGH CURRENT RESISTOR LOWSIDE 346 through a resistor 348 and is filtered by high frequency capacitor 350 to the collector for bypass shunting of high frequency noise. The signal from the emitter of transistor 342 is voltage divided by a resistor divider network comprised of a resistor 352 is in series with a resistor 354 to COMMON with the signal to microcontroller 150 being filtered by high frequency capacitor 356 to bypass shunt high frequency noise to COMMON. By this circuit transistor 342 is normally off and microcontroller 150 normally sees a logical low at pin 343 except for the case when excessive voltage drop across the high current resistor drives transistor on resulting in a high logic signal seen at pin 343.

R-Tap Input

Alternator speed is determined by the microcontroller 150 from analog R-TAP INPUT signal at terminal 360 via the engine connector. The DC value of R-TAP INPUT signal is voltage divided by resistors 362, 364 with the voltage reduced signal filtered by high frequency capacitor 366 to COMMON and supplied to microcontroller 150 at pin 368. An AC value of R-TAP INPUT signal is supplied to microcontroller 150 at pin 370 via series capacitor 372 and voltage divider comprised of a resistor 374 in series with the resistor 376 with the voltage reduced signal filtered by high frequency capacitor 378 to COMMON and supplied to microcontroller 150 at a pin 370. Based upon alternator (engine) speeds the EESS controls a delayed deenergization of the load dump control relay after the run/start switch is switched to the OFF position until after alternator speed and thus alternator output is sufficiently low so that any resultant load dump produced inductive voltage surge will not be of sufficient magnitude to cause any significant harm.

Glow Plug Relay Coil Drive Output

Energization and turn off of GLOW PLUG RELAY COIL DRIVE OUTPUT coupled to the glow plug relay 375 at terminal 310 has circuit characteristics quite similar to LOAD DUMP RELAY COIL DRIVE OUTPUT of terminal 322 as driven by FET 139. In this case the analogous components are drive transistor, FET 170 biasing control and protection components, resistors 380–382, diode 384, and zener diodes 386, 387 PNP transistor 388 and biasing resistors 390, 391; and microcontroller pin 392.

The glow plug relay 375 in the preferred embodiment has a coil that is nominally 12 volts. The coil is driven by turning on and off the FET 170 at a predetermined duty cycle via the microcontroller 150 based on the input voltage sensed by the programmable controller 150 at input pin 182. The pulse width modulation applied by the programmable controller results in an average voltage equivalent to 12 volts on the glow plug relay coil. As the system voltage changes the duty cycle of the pulse is changed to maintain a constant 12 volts.

Use of a lower voltage coil offers several advantages. Firstly these coils can continue to operate over a wide voltage range especially during vehicle starting when system voltages can drop below 10 volts. Typically 24 volt relay coils will not maintain pull in at these low voltages. Secondly, higher spring forces can be used to afford a clean make or break during relay energization or deenergization. This reduces the risk of contact weld during vehicle vibration and at high system voltages (32–40 volts) as well as minimizes relay chatter.

Additionally, the use of programmable controller 150 and FET 170 to pulse width modulate the relay coil, eliminates the need for a voltage regulator or large a low voltage coil continuously. These devices are not only costly but typically generate significant heat and require the use of heat sinks.

Figure 11:
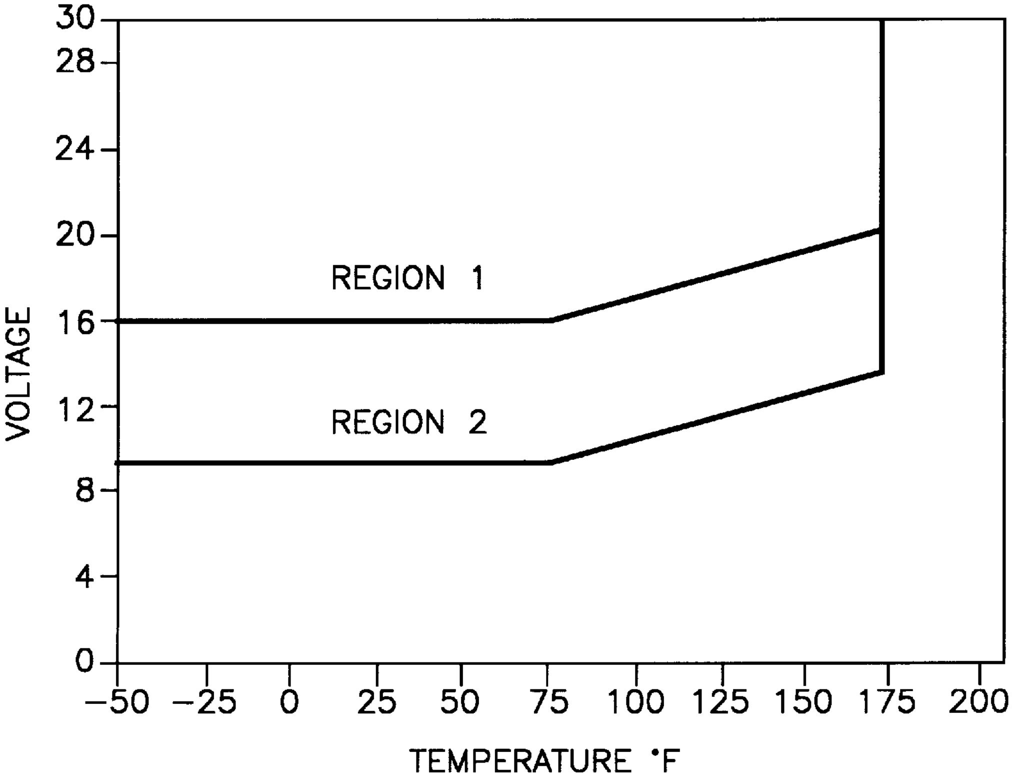
FIG. 11 is a graph indicating operational regions based upon sensed engine block temperature and glow plug energization voltage where control voltages from a programmable controller operate.

FIG. 11 indicates two different operating ranges for the programmable controller of the invention. Prior to starting of the motor vehicle (during preglow), the programmable controller 150 must sense voltages and temperatures in Region 1 of the graph before the controller activates the glow plugs. Once the engine starts to crank, the drain on the battery to energize the starting motor can drop the voltage sensed by the controller. During the afterglow period, the controller must sense voltages in either Region 1 or Region 2 for the controller to continue to activate the glow plugs.

Glow Plug Relay Feedback Input, Glow Plugs Output

Contact closure of the glow plug relay is monitored by microcontroller 150 at pin 394 via resistor 395 from input terminal 396 via engine connector 50 as GLOW PLUG RELAY FEEDBACK INPUT which also represents the voltage of GLOW PLUG OUTPUT at the engine connector. This microcontroller input signal at pin 394 is pulled to COMMON by resistor 398 which provides an effective voltage divider and is also filtered by high frequency capacitor 399 to bypass shunt high frequency noise to COMMON.

Additional Circuits

Preglow Memory

A microcontroller pin 410 (VREF) receives a logic signal from an EESS circuit which will result in skipping the preglow function with immediate initiation of the afterglow 1 function when the run/start switch has been in the OFF position for less than some fixed time, typically three minutes, prior to switching to the RUN position. An operational amplifier 412 (LM2904) configured as a buffer has a series output resistor 414 by which it sends an analog signal to the microcontroller 150 analog input pin (VREF) which pin is also filtered by high frequency capacitor 416 to COMMON. When the EESS is powered up and the value of op amp 412 is read to determine the characteristic RC decay voltage from electrolytic capacitors 418, 419 as slowly discharged by a resistor 420 to determine whether the engine was powered up within some time period, typically three minutes. The microcontroller 150 outputs a logic high at pin 422 which via diode 424 and resistor 426 will recharge the capacitor bank. By this circuit excessive glow plug temperatures are eliminated which would otherwise occur by existing types of controls which automatically enable a preglow time every time the glow plug controller is powered up regardless of previous times of energization.

The preglow cycle time will be modified to maintain the glow plug tip temperature at its specified value ranging from 850 to 1000 degrees Celsius if power to the unit, as provided when the master switch is in the run position, has been removed and reapplied within a specified time. Afterglow cycles will be performed as required. See table 1, as follows, for examples of preglow on time reductions (below the times in chart 1 below) versus the elapsed time the run switch 20 has been switched off. This protection feature prevents premature glow plug failure caused by the master switch being manually switched from off to run within short time periods.

TABLE 1

| Preglow On Time Percent Based on Time Off | |
|---|---|
| Elapsed Time Off | Percent Preglow On Time |
| 0 seconds | 0% |
| 5 seconds | 10% |
| 15 seconds | 25% |
| 30 seconds | 50% |
| 90 seconds | 80% |
| 180 seconds | 100% |

The EESS operating glow plug tip temperature will be achieved in the shortest time possible after run power is applied via the run switch. The operating tip temperature will be 850 to 1000 degrees Celsius for preglow and 800 to 900 degrees Celsius for afterglow.

The EESS 110 will not respond to a DC level or small signal noise applied to the R-TAP line 24 which can occur if leaky diodes are present within the alternator. The EESS unit maintains power on vehicle loads and the heater motor when greater than 92 Hz signal is present when the run/start switch 20 is switched to an off position. Once the R-TAP signal falls below 10 Hz, the loads are turned off.

The EESS will not allow cycling of the glow plugs if the temperature of the engine is greater than 140 degrees Fahrenheit. The unit will provide a one second lamp check to indicate that the glow plug control function is operating properly.

The EESS 110 will not allow the glow plugs to cycle if the alternator 22 is running when power is applied to the start/run switch 20. This protects the glow plugs 12 from intermittent connections until critical engine temperature is achieved, approximately during the first fifteen minutes from a cold start condition.

If the R-TAP signal is seen during the on period of the preglow cycle, the preglow cycle is stopped and the afterglow cycle begins. This protects the glow plugs from damage due to overheating. Normal preglow cycles are performed if the R-TAP signal is below 92 Hz, representative of low idle speed.

The glow plugs will not be cycled if an engine temperature sensor or glow plug controller is not connected to the EESS input 210. The Wait-to-start lamp 34 will flash for a one second lamp check only.

If the mating harness is removed from the glow plug control or engine temperature sensor and reconnected during normal operation, the EESS unit will not cycle the glow plugs.

If no R-TAP signal is applied to the EESS 110 while the start/run switch is closed, glow plug cycling will be stopped after a predetermined time to prevent battery drain.

The EESS 110 will perform voltage compensation glow plug cycling even if an external glow plug controller 200 is installed in the vehicle. The EESS will use the glow plug control for checking shutdown temperature conditions only. The total length of afterglow will default to the maximum time.

The EESS 110 is designed to operate with already installed glow plug controllers 200. An engine temperature sensor 202 or a stand alone glow plug controller 200 may be installed in the water crossover pipe and used. When a glow plug controller is installed, glow plug cycling is controlled by the EESS unit. The EESS unit will perform voltage sensing glow plug cycling. An existing glow plug controller will only be used for over temperature sensing.

Figure 2:
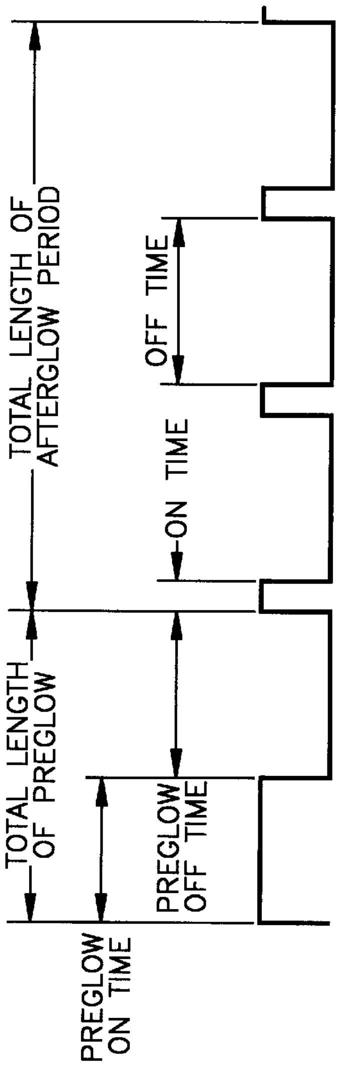
FIG. 2 is a timing diagram showing on and off glow plug energization intervals.
Figure 3:
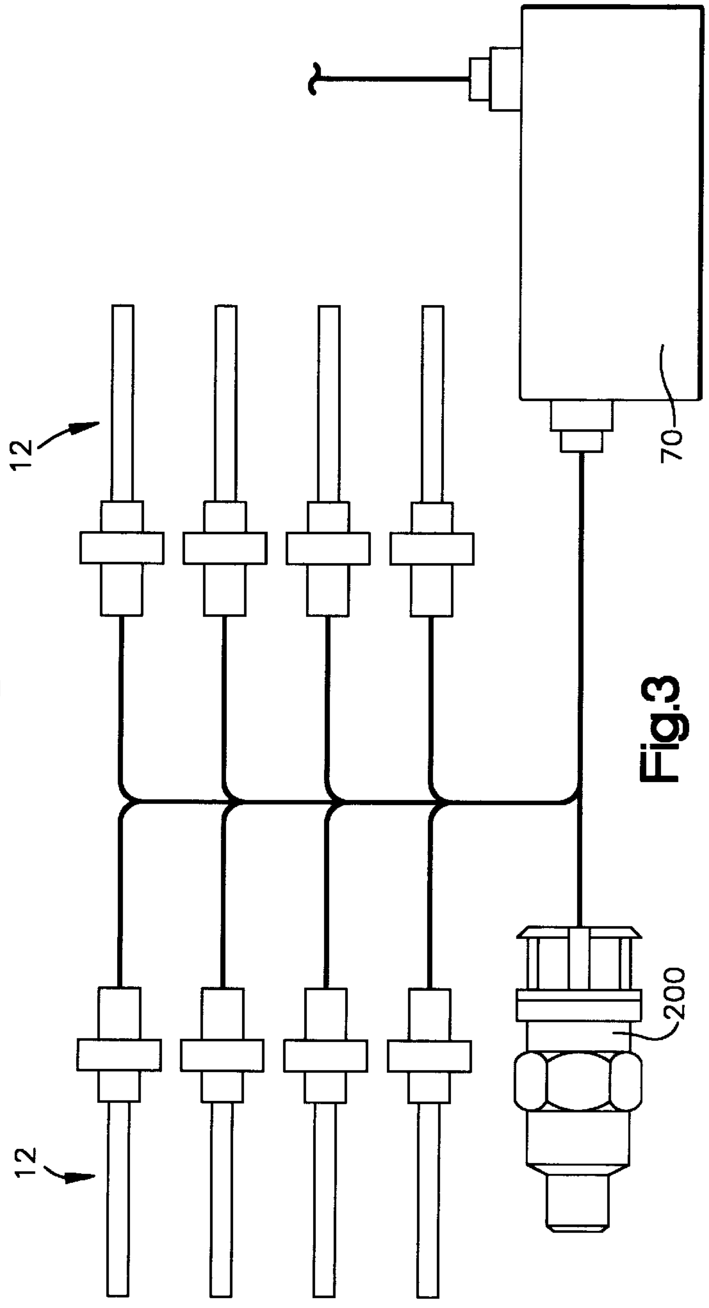
FIG. 3 is a diagram of one embodiment of the present invention showing an engine electrical starting system (EESS) having both a protective control box (PCB) and a glow plug controller.
Figure 4:
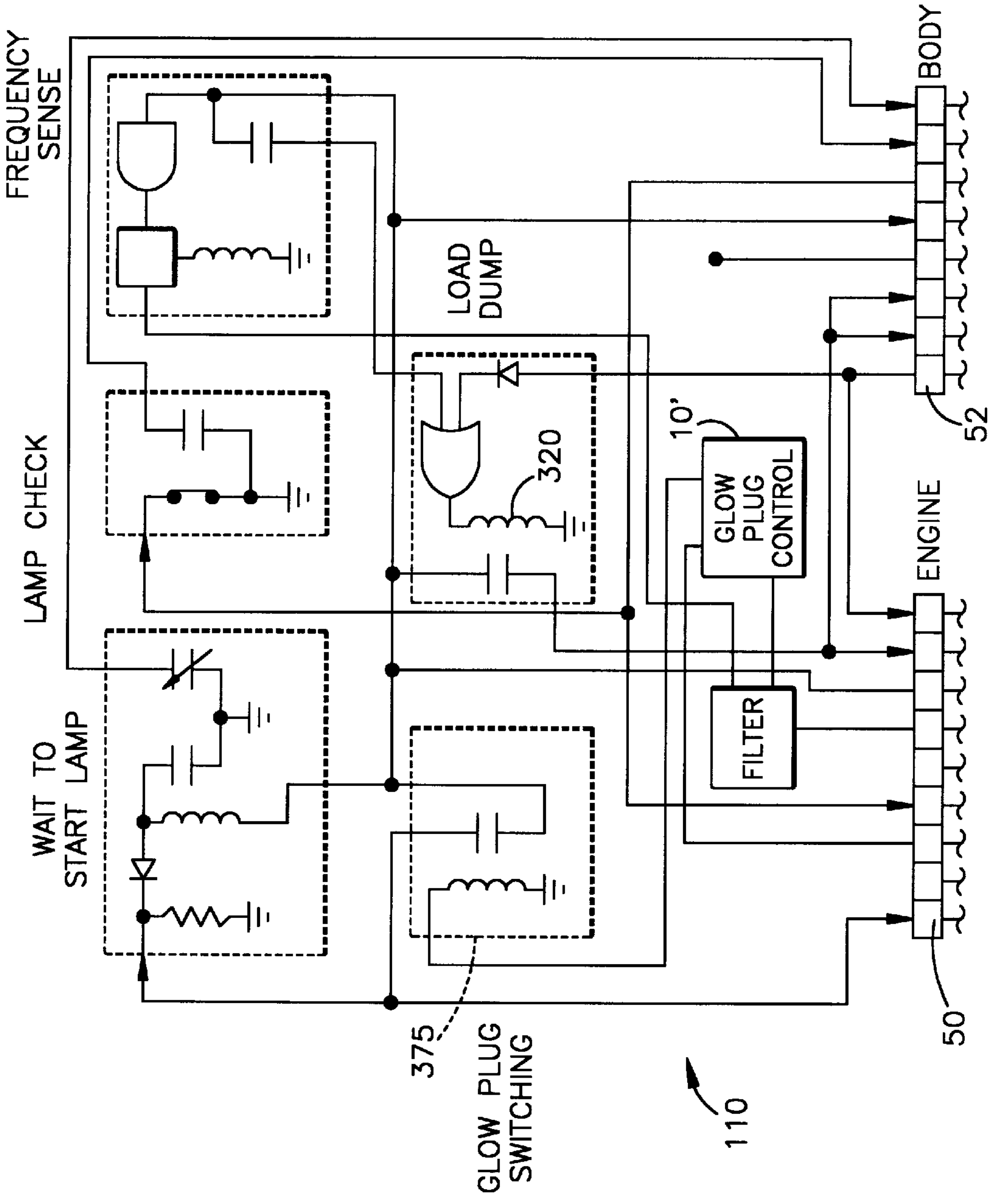
FIG. 4 is a logical function block diagram with a vehicle wiring diagram including major components of one embodiment of the EESS having an integral glowplug controller and an external engine temperature sensor.

For detailed timing of glow plug operation refer to chart 1 below. The meaning of the pre-glow and afterglow periods are depicted in the timing diagram of FIG. 2. The afterglow is divided into two intervals, a first interval occurs after receipt of the start signal from the start/run switch 20 and a second interval after receipt of the R-tap signal indicating the engine is running.

Chart 1

| Function After- | Temperature (degrees C.) | Voltage (Volts) | Output "ON" Time (secs) | Output "Off" Time (secs) | Total Glow |
|---|---|---|---|---|---|
| PreGlow | <=50 | <=18 | 11.00 +/- .25 | 6.00 +/- .25 | |
| PreGlow | <=50 | 22 | 7.30 +/- .25 | 6.00 +/- .25 | |
| PreGlow | <=50 | 24 | 6.00 +/- .25 | 6.00 +/- .25 | |
| PreGlow | <=50 | 28 | 4.50 +/- .25 | 6.00 +/- .25 | |
| PreGlow | <=50 | 32 | 3.40 +/- .25 | 6.00 +/- .25 | |
| PreGlow | >60 | 16–32 | 1.00 +/- .25 | N.A. | |
| AfterGlow | <=50 | 18 | 1.0 + 0.2/–0.1 | 3.00 +/- .25 | (See |
| AfterGlow | <=50 | 22 | 1.0 + 0.2/–0.1 | 5.00 +/- .25 | Below) |
| Afterglow | <=50 | 24 | 1.0 + 0.2/–0.1 | 6.00 +/- .25 | |
| AfterGlow | <=50 | 28 | 1.0 + 0.2/–0.1 | 8.00 +/- .25 | |
| AfterGlow | <=50 | 32 | 1.0 + 0.2/–0.1 | 10.0 +/- .25 | |
| AfterGlow | >60 | 16–32 | 0 | 0 | |
| AfterGlow | –40 | 16–32 | 1.0 + 0.2/–0.1 | (See Above) | 68 +/- 12 |
| After R Tap | –18 | 16–32 | 1.0 + 0.2/–0.1 | | 53 +/- 12 |
| Signal | 25 | 16–32 | 1.0 + 0.2/–0.1 | | 32 +/- 12 |
| | 40 | 16–32 | 1.0 + 0.2/–0.1 | | 28 +/- 12 |
| | 50 | 16–32 | 1.0 + 0.2/–0.1 | | 25.8 +/- 12 |
| | 60 | 16–32 | 0 | | 0 |

Specific details and features can be readily altered as necessary for application to particular diesel engines depending on the chosen type and locations of the glow plugs and/or other system operation variables. The breadth and depth of this disclosure is general in some conceptual teachings and specifc in others as intended to project and anticipate obviousness of future deviations thereof as being encompassed within the general art of the teaching herein.

We claim:

1. For use with a motor vehicle diesel engine having one or more glowplugs for maintaining temperature control of one or more diesel engine combustion chambers, apparatus comprising:

a) a starter control housing supported by the motor vehicle and including a cable connector for routing energization signals into a housing interior from a vehicle mounted power source for use in energizing the glowplugs;

b) monitor circuitry supported within a housing interior for providing an indicator signal corresponding to a voltage applied to the one or more glowplugs;

c) a programmable controller supported within the housing interior that is coupled to the monitor circuitry and produces a control output for supplying energy to the glowplugs;

d) at least one switching device supported within the housing interior that is coupled to the control output from the programmable controller for energizing the one or more glow plugs in a controlled time sequence prior to, during an/or after engine cranking by selectively coupling the energization signals to the glowplugs; and e) load protection circuitry supported within the housing interior for temporarily maintaining an alternator to battery power correction after removal or an ignition signal until engine speed has been reduced to a specified value.

2. The apparatus of claim 1 additionally comprising a separate circuit located outside the housing for monitoring a temperature status of the vehicle engine.

3. The apparatus of claim 1 wherein the programmable controller is programmed to differentiate between signals from a second glow plug control circuit and signals from a temperature sensor.

4. The apparaus of claim 3 wherein the second glow plug circuit includes a controller having at least one output for energizing the glow plugs and a glow plug control signal from the second glow plug circuit is sensed by the programmable controller and said control signal is replaced by signals from separate control circuitry coupled to the programmable controller.

5. The apparatus of claim 4 wherein a cable connector from the programmable controller is plug compatible with a cable connector of the second glow plug controller to allow the programmable controller to replace the second glow plug controller.

6. The apparatus of claim 1 wherein the programmable controller includes a memory for storing diagnostic information relating to diesel engine operation during a previous time period of engine operation.

7. The apparatus of claim 1 additionally comprising communications signal carrying conductors that are routed through the housing connector to enable the programmable controller to communicate with signal generating devices attached to the motor vehicle outside the housing.

8. The apparatus of claim 7 wherein the programmable controller communicates with other modules and/or vehicle electronics via multiplex (MUX) and demultiplex (DEMUX) circuitry and/or dedicated wiring and/or optical methods and/or magnetic field and/or electric field and/or electromagnetic field and/or sonic methods.

9. The apparatus of claim 1 wherein the programmable controller comprises a microprocessor and further wherein analog signals routed into the housing representing a voltage signals from the power source are performed by the microprocessor.

10. The apparatus of claim 1 wherein the housing comprises a metal housing that shields electronic components within the housing from extraneous electromagnetic fields.

11. The apparatus of claim 1 wherein the housing encloses circuitry for filtering transients transmitted through the housing connector.

12. The apparatus of claim 1 comprising reverse voltage protection circuitry within the housing.

13. The apparatus of claim 1 additionally comprising over voltage and under voltage detection circuitry mounted within the housing.

14. The apparatus of claim 1 wherein the at least one switching device comprises at least one solid state switch.

15. The apparatus of claim 1 wherein the at least one switching device comprises at least one switching relay.

16. The apparatus of claim 15 additionally comprising an inductor connected in series with the resistor means having a ferromagnetic core and an inverse parallel freewheeling diode such that the characteristic resistance-inductance electrical rise time with rising current is slow relative to the time of electromechanical contact bounce so as to reduce contact wear and to reduce electrical transients.

17. The apparatus of claim 1 additionally comprising a remote temperature sensor positoned outside the housing for monitoring engine temperature.

18. The apparatus of claim 17 wherein the temperature sensor comprising one of the following a thermistor, a positive temperature coefficient resistor (PTC), a negative temperature coefficient resistor (NTC), a resistance temperature device (RTD), a temperature sensing diode, a temperature sensing integrated circuit, a bimetallic temperature sensor, and a temperature sensitive pressure bulb.

19. The apparatus of claim 17 wherein the temperature sensor is a platinum resistance temperature devices integral within at least one glowplug which can be monitored for control of maximum and minimum glow plug temperatures.

20. The apparatus of claim 17 wherein the temperature sensor monitors a temperature of a glowplug and comprises a circuit for monitoring glow plug resistance by applying a voltage and/or current to the glow plug.

21. The apparatus of claim 20 wherein the glow plug temperature measurement means comprises a circuit for monitoring glow plug resistance by applying an alternating and/or direct voltage and/or current to the glow plug during on and/or off glow plug power energization times and calculating glow plug resistance which correlates with glow plug temperature.

22. The apparatus of claim 20 wherein the glow plug temperature measurement means comprises a circuit for monitoring glow plug resistance by measuring energizing glow plug power voltage and current and calculating glow plug resistance which correlates with glow plug temperature.

23. The apparatus of claim 20 wherein the glow plug temperature measurement means comprises an integral resistance temperature device (RTD) integrated within at least one glow plug.

24. The apparatus of claim 20 wherein the glow plug temperature measurement means comprises a glass fiber that transmits thermal radiation spectra from at least one glow plug to an interface sensor that correlates said spectra with thermal radiation corresponding to temperature.

25. The apparatus of claim 20 wherein the glow plug temperature measurement means is based upon adaptive learned empirical characteristics of glow plug resistance versus temperature sensed by a discrete known engine component temperature sensing element versus time.

26. The apparatus of claim 1 wherein the programmable controller includes an operating system to adjust glowplug energization based upon one or more of the following sensed conditions: Battery voltage, glow plug voltage(s), glow plug current(s), engine temperature(s), ambient air temperature, ambient air density, ambient air humidity, fuel injector operating parameters, intake mass air flow, exhaust gas composition, exhaust gas temperature, alternator output, engine speed, engine torque, engine power, engine compression, engine age, fuel type.

27. The apparatus of claim 1 wherein the programmable controller includes an operating system stored in a memory and wherein the operating system functions can be reprogrammed by adjusting the contents of the memory that are based on temperature sensor characteristics, glowplug resistance versus temperature characteristics, engine age, cylinder compression ratio, mileage, or integrated fuel consumption.

28. The apparatus of claim 1 additionally comprising a current sensor for monitoring current through one or more glow plugs and wherein the programmable controller opens a connection to the glow plugs in the event too high a current is sensed to avoid damage to the glow plugs.

29. The apparatus of claim 1 wherein the programmable controller comprises means based upon various sensed conditions to adjust a preglow energization time and an afterglow energization time to limit excessive temperatures of the glow plugs while applying adequate glow plug energy to facilitate engine starting and warmup.

30. The apparatus of claim 29 wherein the programmable controller adjusts the preglow and afterglow energization times to maintain the glowplug temperature with a specified range above ambient temperature.

31. The apparatus of claim 30 wherein the target temperature for the glow plugs is 850 to 1000 degrees Celsius.

32. The apparatus of claim 29 wherein a wait to start lamp outside the housing is energized during a preglow time period.

33. The apparatus of claim 1 additionally comprising a temperature sensor coupled to the programmable controller and further comprising an output circuit contained within the housing coupled through the housing connector to a light outside the housing and wherein upon application of a power signal to the programmable controller within the housing, the programmable controller outputs an activation signal to illuminate the light during a preglow period unless sensed temperature is above a limit.

34. The apparatus of claim 33 wherein the programmable controller includes diagnostic routines for indicating fault conditions by pulsing the light on and off in a controlled sequence.

35. The apparatus of claim 33 wherein the programmable controller disables glow plug energization above a specified temperature.

36. The apparatus of claim 35 wherein if the programmable controller includes a means for sensing current through the switching device and if at any time current through the switching device exceeds a limit the programmable controller outputs a disabling signal for deactivating the switching device.

37. The apparatus of claim 1 additionally comprising circuitry within the housing for sensing an engine run condition and wherein a preglow period of glow plug energization is adjusted if an engine running condition is sensed within a set time period.

38. The apparatus of claim 37 the preglow period is disabled if the engine is sensed to be running.

39. The apparatus of claim 1 wherein the programmable controller includes an input for sensing if the diesel engine is running within a specified frequency range or an alternator is running or a starter motor is cranking the engine at a specified frequency during a preglow time interval then the preglow is disabled and a second afterglow time interval is enabled.

40. The method of claim 1 wherein the programmable controller includes an input for sensing if the diesel engine is running or an alternator is running within a specified frequency range or the starter motor is cranking the engine and wherein the programmable controller has two afterglow intervals and wherein sensing of a running engine or starter motor cranking causes the programmable controller to enter a second afterglow interval.

41. The apparatus of claim 40 wherein the programmable controller senses if the diesel engine and/or alternator is/are running or the starter motor cranking and if such condition is not sensed at the end of a first afterglow time period, then a glow plug control output is shutdown to save battery energy pending a running signal pending such sensed conditions at which time a second afterglow time commences.

42. The apparatus of claim 41 wherein if the programmable controller determines the engine is running above some speed with glow plugs energized in a second afterglow interval and a run/start switch is changed from a run to an off position, the switching off of the glow plug relay and/or the load dump relay will be delayed until a determination via a connection from the alternator, based upon some set signal frequency and/or amplitude, that its speed has slowed down sufficiently before the glow plug relay and/or the load dump relay are/is deenergized so as to reduce the magnitude of alternator produced load dump voltage spikes when electrical current load sourced from the alternator is switched off.

43. The apparatus of claim 1 comprising two or more relays or solid state switches and including at least one switch per glow plug thus enabling independent switching on and off of glow plugs or groups with staggered switching times for affecting reduction of switching transients and especially reduction of load dump magnitude.

44. The apparatus of claim 1 comprising two or more relays or solid state switches and including at least one switch per glow plug thus enabling independent and possibly individual control based upon inputs and calculated variables.

45. The apparatus of claim 1 wherein the programmable controller includes an input for sensing if the diesel engine and/or alternator is/are running above a specified speed and wherein the programmable controller will not energize glow plugs when power is applied by the vehicle start/run switch to temperature resulting from intermittent electrical connections.

46. The apparatus of claim 1 wherein the programmable controller includes a timer means to measure the time elapsed since the last glow plug energization cycle and wherein the programmable controller prorates an immediate preglow energization time of glow plugs based on said elapsed time.

47. The apparatus of claim 1 comprising at least one solid state switch per glow plug to enable independent switching on and off of glow plugs or groups thereof with controlled switching slew rates for affedting reduction of switching transients.

48. For use with a motor vehicle diesel engine having one or more glowplugs for maintaining temperature control of one or more diesel engine combustion chambers, a method of starting the diesel engine comprising the steps of:

a) monitoring an indicator signal corresponding to a voltage applied to the one or more glowplugs;

b) providing a programmable controller and supporting the programmable controller within a housing interior;

c) producing a controlled output from the programmable controller to produce a controlled energization of the glowplugs prior to, during, and/or after engine cranking;

d) coupling the controlled output from the programmable controller to at least one a switching device supported within the housing interior for energizing the one or more glow plugs in a controlled time sequence prior to during, and/or after engine cranking;

e) sensing an output from a vehicle alternator to sense engine speed; and f) temporarily maintaining alternator to battery power connection after removal of an ignition signal until engine speed has been reduced to a specific value.

49. The method of claim 48 additionally comprising the step of storing operating parameters of the diesel engine in a programmable controller memory for use in diagnosing engine conditions.

50. The method of claim 48 additionally comprising the step of generating communications signals to other programmable controllers within the motor vehicle.

51. The method of claim 48 additionally comprising the steps of monitoring a temperature of the vehicle engine to control glow plug energiziation.

52. The method of claim 51 wherein the step of monitoring the temperature is performed by receipt of a temperature signal from outside the housing.

* * * * *